(12) United States Patent
Kihas

(10) Patent No.: US 9,170,573 B2
(45) Date of Patent: Oct. 27, 2015

(54) METHOD AND SYSTEM FOR UPDATING TUNING PARAMETERS OF A CONTROLLER

(71) Applicant: Honeywell International Inc., Morristown, NJ (US)

(72) Inventor: Dejan Kihas, Burnaby, CA (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 14/108,899

(22) Filed: Dec. 17, 2013

(65) Prior Publication Data

US 2014/0094938 A1   Apr. 3, 2014

Related U.S. Application Data

(63) Continuation of application No. 12/565,873, filed on Sep. 24, 2009, now Pat. No. 8,620,461.

(51) Int. Cl.
  *G05B 13/04*   (2006.01)
  *G05B 17/02*   (2006.01)

(52) U.S. Cl.
  CPC ............ *G05B 13/042* (2013.01); *G05B 13/048* (2013.01); *G05B 17/02* (2013.01)

(58) Field of Classification Search
  CPC ..... G05B 13/042; G05B 13/048; G05B 17/02
  USPC ................................ 700/28–32; 717/121, 151
  See application file for complete search history.

(56) References Cited

U.S. PATENT DOCUMENTS 3,744,461 A   7/1973   Davis
4,005,578 A   2/1977   McInerney (Continued)

FOREIGN PATENT DOCUMENTS

DE   19628796 C1   10/1997
DE   10219832 A1   11/2003

(Continued)

OTHER PUBLICATIONS

"Model Predictive Control," Wikipedia, pp. 1-5, Jan. 22, 2009. http://en.wikipedia.org/w/index.php/title=Special:  Book &bookcmd=download&collecton—id=641cd1b5da77cc22 &writer=rl&return—to=Model predictive control, retrieved Nov. 20, 2012.

(Continued)

*Primary Examiner* — Mohammad Ali
*Assistant Examiner* — Nathan L Laughlin
(74) *Attorney, Agent, or Firm* — Seager, Tufte & Wickhem LLC

(57) ABSTRACT

A method and system for updating tuning parameters associated with a controller without repetitive compilation of a controller code. The controller code represents an algorithm associated with the controller and can be compiled separately from a data set representing a solution for an optimization problem and also from a data set representing parameters required for prediction. The algorithm can be implemented in a programming language code suitable for implementation on an embedded platform or other types of computer platforms. The data sets can be represented in a specified data structure and the variables associated with the data structure can be declared in the controller template code. The variables can be updated independently without varying the compiled code associated with the controller algorithm that is referring to the variables. The controller can also be updated while the controller actively performs online. Such an approach enables repetitive tuning of the controller without repetitive compilation of the code representing the controller algorithm.

20 Claims, 12 Drawing Sheets

(56) References Cited

U.S. PATENT DOCUMENTS

| | | |
|---|---|---|
| 4,055,158 A | 10/1977 | Marsee |
| 4,206,606 A | 6/1980 | Yamada |
| 4,252,098 A | 2/1981 | Tomczak et al. |
| 4,359,991 A | 11/1982 | Stumpp et al. |
| 4,383,441 A | 5/1983 | Willis et al. |
| 4,426,982 A | 1/1984 | Lehner et al. |
| 4,438,497 A | 3/1984 | Willis et al. |
| 4,440,140 A | 4/1984 | Kawagoe et al. |
| 4,456,883 A | 6/1984 | Bullis et al. |
| 4,485,794 A | 12/1984 | Kimberley et al. |
| 4,601,270 A | 7/1986 | Kimberley et al. |
| 4,616,308 A | 10/1986 | Morshedi et al. |
| 4,653,449 A | 3/1987 | Kamei et al. |
| 4,671,235 A | 6/1987 | Hosaka |
| 4,677,559 A | 6/1987 | Van Brueck et al. |
| 4,735,181 A | 4/1988 | Kaneko et al. |
| 4,947,334 A | 8/1990 | Massey et al. |
| 4,962,570 A | 10/1990 | Hosaka et al. |
| 5,044,337 A | 9/1991 | Williams et al. |
| 5,076,237 A | 12/1991 | Hartman et al. |
| 5,089,236 A | 2/1992 | Clerc |
| 5,094,213 A | 3/1992 | Dudek et al. |
| 5,095,874 A | 3/1992 | Schnaibel et al. |
| 5,108,716 A | 4/1992 | Nishizawa |
| 5,123,397 A | 6/1992 | Richeson |
| 5,150,289 A | 9/1992 | Badavas |
| 5,186,081 A | 2/1993 | Richardson et al. |
| 5,233,829 A | 8/1993 | Komatsu |
| 5,270,935 A | 12/1993 | Dudek et al. |
| 5,273,019 A | 12/1993 | Matthews et al. |
| 5,282,449 A | 2/1994 | Takahashi et al. |
| 5,293,553 A | 3/1994 | Dudek et al. |
| 5,349,816 A | 9/1994 | Sanbayashi et al. |
| 5,365,734 A | 11/1994 | Takeshima |
| 5,394,322 A | 2/1995 | Hansen et al. |
| 5,394,331 A | 2/1995 | Dudek et al. |
| 5,398,502 A | 3/1995 | Watanabe |
| 5,408,406 A | 4/1995 | Mathur et al. |
| 5,431,139 A | 7/1995 | Grutter et al. |
| 5,452,576 A | 9/1995 | Hamburg et al. |
| 5,477,840 A | 12/1995 | Neumann |
| 5,560,208 A | 10/1996 | Halimi et al. |
| 5,570,574 A | 11/1996 | Yamashita et al. |
| 5,598,825 A | 2/1997 | Neumann |
| 5,609,139 A | 3/1997 | Ueda et al. |
| 5,611,198 A | 3/1997 | Lane et al. |
| 5,690,086 A | 11/1997 | Kawano et al. |
| 5,692,478 A | 12/1997 | Nogi et al. |
| 5,697,339 A | 12/1997 | Esposito |
| 5,704,011 A | 12/1997 | Hansen et al. |
| 5,746,183 A | 5/1998 | Parke et al. |
| 5,765,533 A | 6/1998 | Nakajima et al. |
| 5,771,867 A | 6/1998 | Amstutz et al. |
| 5,785,030 A | 7/1998 | Paas |
| 5,788,004 A | 8/1998 | Friedmann et al. |
| 5,842,340 A | 12/1998 | Bush et al. |
| 5,846,157 A | 12/1998 | Reinke et al. |
| 5,893,092 A | 4/1999 | Driscoll |
| 5,942,195 A | 8/1999 | Lecea et al. |
| 5,964,199 A | 10/1999 | Atago et al. |
| 5,970,075 A | 10/1999 | Wasada |
| 5,974,788 A | 11/1999 | Hepburn et al. |
| 5,995,895 A | 11/1999 | Watt et al. |
| 6,029,626 A | 2/2000 | Bruestle |
| 6,035,640 A | 3/2000 | Kolmanovsky et al. |
| 6,048,620 A | 4/2000 | Zhong et al. |
| 6,048,628 A | 4/2000 | Hillmann et al. |
| 6,055,810 A | 5/2000 | Borland et al. |
| 6,058,700 A | 5/2000 | Yamashita et al. |
| 6,067,800 A | 5/2000 | Kolmanovsky et al. |
| 6,076,353 A | 6/2000 | Freudenberg et al. |
| 6,105,365 A | 8/2000 | Deeba et al. |
| 6,122,555 A | 9/2000 | Lu |
| 6,134,883 A | 10/2000 | Kato et al. |
| 6,153,159 A | 11/2000 | Engeler et al. |
| 6,161,528 A | 12/2000 | Akao et al. |
| 6,170,259 B1 | 1/2001 | Boegner et al. |
| 6,171,556 B1 | 1/2001 | Burk et al. |
| 6,178,743 B1 | 1/2001 | Hirota et al. |
| 6,178,749 B1 | 1/2001 | Kolmanovsky et al. |
| 6,208,914 B1 | 3/2001 | Ward et al. |
| 6,216,083 B1 | 4/2001 | Ulyanov et al. |
| 6,233,922 B1 | 5/2001 | Maloney |
| 6,236,956 B1 | 5/2001 | Mantooth et al. |
| 6,237,330 B1 | 5/2001 | Takahashi et al. |
| 6,242,873 B1 | 6/2001 | Drozdz et al. |
| 6,263,672 B1 | 7/2001 | Roby et al. |
| 6,273,060 B1 | 8/2001 | Cullen |
| 6,279,551 B1 | 8/2001 | Iwano et al. |
| 6,312,538 B1 | 11/2001 | Latypov et al. |
| 6,314,724 B1 | 11/2001 | Kakuyama et al. |
| 6,321,538 B2 | 11/2001 | Hasler |
| 6,327,361 B1 | 12/2001 | Harshavardhana et al. |
| 6,338,245 B1 | 1/2002 | Shimoda et al. |
| 6,341,487 B1 | 1/2002 | Takahashi et al. |
| 6,347,619 B1 | 2/2002 | Whiting et al. |
| 6,360,159 B1 | 3/2002 | Miller et al. |
| 6,360,541 B2 | 3/2002 | Waszkiewicz |
| 6,360,732 B1 | 3/2002 | Bailey et al. |
| 6,363,715 B1 | 4/2002 | Bidner et al. |
| 6,363,907 B1 | 4/2002 | Arai et al. |
| 6,379,281 B1 | 4/2002 | Collins et al. |
| 6,389,803 B1 | 5/2002 | Surnilla et al. |
| 6,425,371 B2 | 7/2002 | Majima |
| 6,427,436 B1 | 8/2002 | Allansson et al. |
| 6,431,160 B1 | 8/2002 | Sugiyama et al. |
| 6,445,963 B1 | 9/2002 | Blevins et al. |
| 6,446,430 B1 | 9/2002 | Roth et al. |
| 6,453,308 B1 | 9/2002 | Zhao et al. |
| 6,463,733 B1 | 10/2002 | Asik et al. |
| 6,463,734 B1 | 10/2002 | Tamura et al. |
| 6,466,893 B1 | 10/2002 | Latwesen et al. |
| 6,470,682 B2 | 10/2002 | Gray, Jr. |
| 6,470,862 B2 | 10/2002 | Isobe et al. |
| 6,470,886 B1 | 10/2002 | Jestrabek-Hart |
| 6,494,038 B2 | 12/2002 | Kobayashi et al. |
| 6,502,391 B1 | 1/2003 | Hirota et al. |
| 6,510,351 B1 | 1/2003 | Blevins et al. |
| 6,512,974 B2 | 1/2003 | Houston et al. |
| 6,513,495 B1 | 2/2003 | Franke et al. |
| 6,532,433 B2 | 3/2003 | Bharadwaj et al. |
| 6,546,329 B2 | 4/2003 | Bellinger |
| 6,550,307 B1 | 4/2003 | Zhang et al. |
| 6,553,754 B2 | 4/2003 | Meyer et al. |
| 6,560,528 B1 | 5/2003 | Gitlin et al. |
| 6,560,960 B2 | 5/2003 | Nishimura et al. |
| 6,571,191 B1 | 5/2003 | York et al. |
| 6,579,206 B2 | 6/2003 | Liu et al. |
| 6,591,605 B2 | 7/2003 | Lewis |
| 6,594,990 B2 | 7/2003 | Kuenstler et al. |
| 6,601,387 B2 | 8/2003 | Zurawski et al. |
| 6,612,293 B2 | 9/2003 | Schweinzer et al. |
| 6,615,584 B2 | 9/2003 | Ostertag |
| 6,625,978 B1 | 9/2003 | Eriksson et al. |
| 6,629,408 B1 | 10/2003 | Murakami et al. |
| 6,637,382 B1 | 10/2003 | Brehob et al. |
| 6,644,017 B2 | 11/2003 | Takahashi et al. |
| 6,647,710 B2 | 11/2003 | Nishiyama et al. |
| 6,647,971 B2 | 11/2003 | Vaughan et al. |
| 6,651,614 B2 | 11/2003 | Flämig-Vetter et al. |
| 6,662,058 B1 | 12/2003 | Sanchez et al. |
| 6,666,198 B2 | 12/2003 | Mitsutani |
| 6,666,410 B2 | 12/2003 | Boelitz et al. |
| 6,671,603 B2 | 12/2003 | Cari et al. |
| 6,672,052 B2 | 1/2004 | Taga et al. |
| 6,672,060 B1 | 1/2004 | Buckland et al. |
| 6,679,050 B1 | 1/2004 | Takahashi et al. |
| 6,687,597 B2 | 2/2004 | Sulatisky et al. |
| 6,688,283 B2 | 2/2004 | Jaye |
| 6,694,244 B2 | 2/2004 | Meyer et al. |
| 6,694,724 B2 | 2/2004 | Tanaka et al. |
| 6,705,084 B2 | 3/2004 | Allen et al. |
| 6,718,254 B2 | 4/2004 | Hashimoto et al. |
| 6,718,753 B2 | 4/2004 | Bromberg et al. |

(56) References Cited

U.S. PATENT DOCUMENTS

| | | |
|---|---|---|
| 6,725,208 B1 | 4/2004 | Hartman et al. |
| 6,736,120 B2 | 5/2004 | Surnilla |
| 6,739,122 B2 | 5/2004 | Kitajima et al. |
| 6,742,330 B2 | 6/2004 | Genderen |
| 6,743,352 B2 | 6/2004 | Ando et al. |
| 6,748,936 B2 | 6/2004 | Kinomura et al. |
| 6,752,131 B2 | 6/2004 | Poola et al. |
| 6,752,135 B2 | 6/2004 | McLaughlin et al. |
| 6,758,037 B2 | 7/2004 | Terada et al. |
| 6,760,631 B1 | 7/2004 | Berkowitz et al. |
| 6,760,657 B2 | 7/2004 | Katoh |
| 6,760,658 B2 | 7/2004 | Yasui et al. |
| 6,770,009 B2 | 8/2004 | Badillo et al. |
| 6,772,585 B2 | 8/2004 | Iihoshi et al. |
| 6,779,344 B2 | 8/2004 | Hartman et al. |
| 6,779,512 B2 | 8/2004 | Mitsutani |
| 6,788,072 B2 | 9/2004 | Nagy et al. |
| 6,789,533 B1 | 9/2004 | Hashimoto et al. |
| 6,792,927 B2 | 9/2004 | Kobayashi |
| 6,804,618 B2 | 10/2004 | Junk |
| 6,814,062 B2 | 11/2004 | Esteghlal et al. |
| 6,817,171 B2 | 11/2004 | Zhu |
| 6,823,667 B2 | 11/2004 | Braun et al. |
| 6,823,675 B2 | 11/2004 | Brunell et al. |
| 6,826,903 B2 | 12/2004 | Yahata et al. |
| 6,827,060 B2 | 12/2004 | Huh |
| 6,827,061 B2 | 12/2004 | Nytomt et al. |
| 6,827,070 B2 | 12/2004 | Fehl et al. |
| 6,834,497 B2 | 12/2004 | Miyoshi et al. |
| 6,839,637 B2 | 1/2005 | Moteki et al. |
| 6,849,030 B2 | 2/2005 | Yamamoto |
| 6,874,467 B2 | 4/2005 | Hunt et al. |
| 6,879,906 B2 | 4/2005 | Makki et al. |
| 6,904,751 B2 | 6/2005 | Makki et al. |
| 6,911,414 B2 | 6/2005 | Kimura et al. |
| 6,915,779 B2 | 7/2005 | Sriprakash |
| 6,920,865 B2 | 7/2005 | Lyon |
| 6,925,372 B2 | 8/2005 | Yasui |
| 6,925,796 B2 | 8/2005 | Nieuwstadt et al. |
| 6,928,362 B2 | 8/2005 | Meaney |
| 6,928,817 B2 | 8/2005 | Ahmad |
| 6,931,840 B2 | 8/2005 | Strayer et al. |
| 6,934,931 B2 | 8/2005 | Plumer et al. |
| 6,941,033 B2 | 9/2005 | Taylor et al. |
| 6,941,744 B2 | 9/2005 | Tanaka |
| 6,945,033 B2 | 9/2005 | Sealy et al. |
| 6,948,310 B2 | 9/2005 | Roberts, Jr. et al. |
| 6,953,024 B2 | 10/2005 | Linna et al. |
| 6,965,826 B2 | 11/2005 | Andres et al. |
| 6,968,677 B2 | 11/2005 | Tamura |
| 6,971,258 B2 | 12/2005 | Rhodes et al. |
| 6,973,382 B2 | 12/2005 | Rodriguez et al. |
| 6,978,744 B2 | 12/2005 | Yuasa et al. |
| 6,996,975 B2 | 2/2006 | Radhamohan et al. |
| 7,000,379 B2 | 2/2006 | Makki et al. |
| 7,013,637 B2 | 3/2006 | Yoshida |
| 7,016,779 B2 | 3/2006 | Bowyer |
| 7,028,464 B2 | 4/2006 | Rösel et al. |
| 7,039,475 B2 | 5/2006 | Sayyarrodsari et al. |
| 7,047,938 B2 | 5/2006 | Flynn et al. |
| 7,052,434 B2 | 5/2006 | Makino et al. |
| 7,055,311 B2 | 6/2006 | Beutel et al. |
| 7,059,112 B2 | 6/2006 | Bidner et al. |
| 7,063,080 B2 | 6/2006 | Kita et al. |
| 7,069,903 B2 | 7/2006 | Surnilla et al. |
| 7,082,753 B2 | 8/2006 | Dalla Betta et al. |
| 7,085,615 B2 | 8/2006 | Persson et al. |
| 7,106,866 B2 | 9/2006 | Astorino et al. |
| 7,107,978 B2 | 9/2006 | Itoyama |
| 7,111,450 B2 | 9/2006 | Surnilla |
| 7,111,455 B2 | 9/2006 | Okugawa et al. |
| 7,113,835 B2 | 9/2006 | Boyden et al. |
| 7,117,046 B2 | 10/2006 | Boyden et al. |
| 7,124,013 B2 | 10/2006 | Yasui |
| 7,149,590 B2 | 12/2006 | Martin et al. |
| 7,151,976 B2 | 12/2006 | Lin |
| 7,152,023 B2 | 12/2006 | Das |
| 7,155,334 B1 | 12/2006 | Stewart et al. |
| 7,165,393 B2 | 1/2007 | Betta et al. |
| 7,165,399 B2 | 1/2007 | Stewart |
| 7,168,239 B2 | 1/2007 | Ingram et al. |
| 7,182,075 B2 | 2/2007 | Shahed et al. |
| 7,184,845 B2 | 2/2007 | Sayyarrodsari et al. |
| 7,184,992 B1 | 2/2007 | Polyak et al. |
| 7,188,637 B2 | 3/2007 | Dreyer et al. |
| 7,194,987 B2 | 3/2007 | Mogi |
| 7,197,485 B2 | 3/2007 | Fuller |
| 7,200,988 B2 | 4/2007 | Yamashita |
| 7,204,079 B2 | 4/2007 | Audoin |
| 7,275,374 B2 | 10/2007 | Stewart et al. |
| 7,275,415 B2 | 10/2007 | Rhodes et al. |
| 7,292,926 B2 | 11/2007 | Schmidt et al. |
| 7,302,937 B2 | 12/2007 | Ma et al. |
| 7,321,834 B2 | 1/2008 | Chu et al. |
| 7,323,036 B2 | 1/2008 | Boyden et al. |
| 7,328,577 B2 | 2/2008 | Stewart et al. |
| 7,337,022 B2 | 2/2008 | Wojsznis et al. |
| 7,349,776 B2 | 3/2008 | Spillane et al. |
| 7,357,125 B2 | 4/2008 | Kolavennu |
| 7,375,374 B2 | 5/2008 | Chen et al. |
| 7,376,471 B2 | 5/2008 | Das et al. |
| 7,389,773 B2 | 6/2008 | Stewart et al. |
| 7,392,129 B2 | 6/2008 | Hill et al. |
| 7,398,149 B2 | 7/2008 | Ueno et al. |
| 7,400,967 B2 | 7/2008 | Ueno et al. |
| 7,413,583 B2 | 8/2008 | Langer et al. |
| 7,415,389 B2 | 8/2008 | Stewart et al. |
| 7,418,372 B2 | 8/2008 | Nishira et al. |
| 7,430,854 B2 | 10/2008 | Yasui et al. |
| 7,433,743 B2 | 10/2008 | Pistikopoulos et al. |
| 7,444,191 B2 | 10/2008 | Caldwell et al. |
| 7,444,193 B2 | 10/2008 | Cutler |
| 7,447,554 B2 | 11/2008 | Cutler |
| 7,467,614 B2 | 12/2008 | Stewart et al. |
| 7,469,177 B2 | 12/2008 | Samad et al. |
| 7,493,236 B1 | 2/2009 | Mock et al. |
| 7,515,975 B2 | 4/2009 | Stewart |
| 7,522,963 B2 | 4/2009 | Boyden et al. |
| 7,536,232 B2 | 5/2009 | Boyden et al. |
| 7,542,842 B2 | 6/2009 | Hill et al. |
| 7,577,483 B2 | 8/2009 | Fan et al. |
| 7,587,253 B2 | 9/2009 | Rawlings et al. |
| 7,591,135 B2 | 9/2009 | Stewart |
| 7,599,749 B2 | 10/2009 | Sayyarrodsari et al. |
| 7,599,750 B2 | 10/2009 | Piche |
| 7,627,843 B2 | 12/2009 | Dozorets et al. |
| 7,630,868 B2 | 12/2009 | Turner et al. |
| 7,634,323 B2 | 12/2009 | Vermillion et al. |
| 7,634,417 B2 | 12/2009 | Boyden et al. |
| 7,650,780 B2 | 1/2010 | Hall |
| 7,668,704 B2 | 2/2010 | Perchanok et al. |
| 7,698,004 B2 | 4/2010 | Boyden et al. |
| 7,702,519 B2 | 4/2010 | Boyden et al. |
| 7,743,606 B2 | 6/2010 | Havlena et al. |
| 7,752,840 B2 | 7/2010 | Stewart |
| 7,765,792 B2 | 8/2010 | Rhodes et al. |
| 7,793,489 B2 | 9/2010 | Wang et al. |
| 7,798,938 B2 | 9/2010 | Matsubara et al. |
| 7,826,909 B2 | 11/2010 | Attarwala |
| 7,831,318 B2 | 11/2010 | Bartee et al. |
| 7,840,287 B2 | 11/2010 | Wojsznis et al. |
| 7,844,351 B2 | 11/2010 | Piche |
| 7,844,352 B2 | 11/2010 | Vouzis et al. |
| 7,846,299 B2 | 12/2010 | Backstrom et al. |
| 7,850,104 B2 | 12/2010 | Havlena et al. |
| 7,856,966 B2 | 12/2010 | Saitoh |
| 7,860,586 B2 | 12/2010 | Boyden et al. |
| 7,862,771 B2 | 1/2011 | Boyden et al. |
| 7,877,239 B2 | 1/2011 | Grichnik et al. |
| 7,878,178 B2 | 2/2011 | Stewart et al. |
| 7,904,280 B2 | 3/2011 | Wood |
| 7,905,103 B2 | 3/2011 | Larsen et al. |
| 7,907,769 B2 | 3/2011 | Sammak et al. |
| 7,930,044 B2 | 4/2011 | Attarwala |

(56) References Cited

U.S. PATENT DOCUMENTS

| | | | |
|---|---|---|---|
| 7,933,849 B2 | 4/2011 | Bartee et al. |
| 7,958,730 B2 | 6/2011 | Stewart |
| 7,987,145 B2 | 7/2011 | Baramov |
| 7,996,140 B2 | 8/2011 | Stewart et al. |
| 8,019,911 B2 | 9/2011 | Dressler et al. |
| 8,025,167 B2 | 9/2011 | Schneider et al. |
| 8,032,235 B2 | 10/2011 | Sayyar-Rodsari |
| 8,060,290 B2 | 11/2011 | Stewart et al. |
| 8,078,291 B2 | 12/2011 | Pekar et al. |
| 8,109,255 B2 | 2/2012 | Stewart et al. |
| 8,360,040 B2 | 1/2013 | Stewart et al. |
| 8,620,461 B2 | 12/2013 | Kihas |
| 2002/0116104 A1 | 8/2002 | Kawashima et al. |
| 2003/0089102 A1 | 5/2003 | Colignon et al. |
| 2003/0150961 A1 | 8/2003 | Boelitz et al. |
| 2004/0006973 A1 | 1/2004 | Makki et al. |
| 2004/0034460 A1 | 2/2004 | Folkerts et al. |
| 2004/0086185 A1 | 5/2004 | Sun |
| 2004/0117766 A1 | 6/2004 | Mehta et al. |
| 2004/0118107 A1 | 6/2004 | Ament |
| 2004/0165781 A1 | 8/2004 | Sun |
| 2004/0199481 A1 | 10/2004 | Hartman et al. |
| 2004/0221889 A1 | 11/2004 | Dreyer et al. |
| 2004/0226287 A1 | 11/2004 | Edgar et al. |
| 2005/0143952 A1 | 6/2005 | Tomoyasu et al. |
| 2005/0171667 A1 | 8/2005 | Morita |
| 2005/0187643 A1 | 8/2005 | Sayyar-Rodsari et al. |
| 2005/0193739 A1 | 9/2005 | Brunell |
| 2005/0209714 A1 | 9/2005 | Rawlings et al. |
| 2005/0210868 A1 | 9/2005 | Funabashi |
| 2005/0221514 A1* | 10/2005 | Pasadyn et al. .................. 438/14 |
| 2006/0047607 A1 | 3/2006 | Boyden et al. |
| 2006/0111881 A1 | 5/2006 | Jackson |
| 2006/0137346 A1 | 6/2006 | Stewart et al. |
| 2006/0168945 A1 | 8/2006 | Samad et al. |
| 2006/0265203 A1 | 11/2006 | Jenny et al. |
| 2006/0282178 A1 | 12/2006 | Das |
| 2007/0142936 A1 | 6/2007 | Denison et al. |
| 2007/0144149 A1 | 6/2007 | Kolavennu et al. |
| 2007/0156259 A1 | 7/2007 | Baramov |
| 2007/0275471 A1 | 11/2007 | Coward |
| 2008/0071395 A1 | 3/2008 | Pachner |
| 2008/0097625 A1 | 4/2008 | Vouzis et al. |
| 2008/0103747 A1 | 5/2008 | Macharia et al. |
| 2008/0103748 A1 | 5/2008 | Axelrud et al. |
| 2008/0104003 A1 | 5/2008 | Macharia et al. |
| 2008/0109100 A1 | 5/2008 | Macharia et al. |
| 2008/0125875 A1 | 5/2008 | Stewart |
| 2008/0132178 A1 | 6/2008 | Chatterjee et al. |
| 2008/0183311 A1 | 7/2008 | MacArthur et al. |
| 2008/0208778 A1 | 8/2008 | Sayyar-Rodsari et al. |
| 2008/0244449 A1 | 10/2008 | Morrison et al. |
| 2009/0005889 A1 | 1/2009 | Sayyar-Rodsari |
| 2009/0008351 A1 | 1/2009 | Schneider et al. |
| 2009/0043546 A1 | 2/2009 | Srinivasan et al. |
| 2009/0131216 A1 | 5/2009 | Matsubara et al. |
| 2009/0182518 A1 | 7/2009 | Chu et al. |
| 2009/0198350 A1 | 8/2009 | Thiele |
| 2009/0240480 A1 | 9/2009 | Baramov |
| 2009/0254202 A1 | 10/2009 | Pekar et al. |
| 2009/0287320 A1 | 11/2009 | MacGregor et al. |
| 2009/0312998 A1 | 12/2009 | Berckmans et al. |
| 2010/0017094 A1 | 1/2010 | Stewart et al. |
| 2010/0038158 A1 | 2/2010 | Whitney et al. |
| 2010/0050607 A1 | 3/2010 | He et al. |
| 2010/0122523 A1 | 5/2010 | Vosz |
| 2010/0204808 A1 | 8/2010 | Thiele |
| 2010/0268353 A1 | 10/2010 | Crisalle et al. |
| 2010/0300070 A1 | 12/2010 | He et al. |
| 2010/0305719 A1 | 12/2010 | Pekar et al. |
| 2010/0327090 A1 | 12/2010 | Havlena et al. |
| 2011/0006025 A1 | 1/2011 | Schneider et al. |
| 2011/0010073 A1 | 1/2011 | Stewart et al. |
| 2011/0029235 A1 | 2/2011 | Berry |
| 2011/0046752 A1 | 2/2011 | Piche |
| 2011/0060424 A1 | 3/2011 | Havlena |
| 2011/0066308 A1 | 3/2011 | Yang et al. |
| 2011/0087420 A1 | 4/2011 | Stewart et al. |
| 2011/0104015 A1 | 5/2011 | Boyden et al. |
| 2011/0125293 A1 | 5/2011 | Havlena |
| 2011/0167025 A1 | 7/2011 | Danai et al. |
| 2011/0270505 A1 | 11/2011 | Chaturvedi et al. |
| 2011/0301723 A1 | 12/2011 | Pekar et al. |
| 2012/0010732 A1 | 1/2012 | Stewart et al. |
| 2012/0116649 A1 | 5/2012 | Stewart et al. |
| 2013/0067894 A1 | 3/2013 | Stewart et al. |
| 2013/0111878 A1 | 5/2013 | Pachner et al. |
| 2013/0111905 A1 | 5/2013 | Pekar et al. |

FOREIGN PATENT DOCUMENTS

| | | |
|---|---|---|
| EP | 0301527 A2 | 2/1989 |
| EP | 0950803 A2 | 10/1999 |
| EP | 1134368 A2 | 9/2001 |
| EP | 1225490 A2 | 7/2002 |
| EP | 1245811 A2 | 10/2002 |
| EP | 1180583 A2 | 3/2004 |
| EP | 1221544 A2 | 3/2006 |
| EP | 1686251 A1 | 8/2006 |
| EP | 2107439 A1 | 10/2009 |
| EP | 2146258 A1 | 1/2010 |
| JP | 59190443 A | 10/1984 |
| JP | 2010282618 A | 12/2010 |
| WO | 0232552 A1 | 4/2002 |
| WO | 02101208 A1 | 12/2002 |
| WO | 03048533 A1 | 6/2003 |
| WO | 03065135 A1 | 8/2003 |
| WO | 03078816 A1 | 9/2003 |
| WO | 2004027230 A1 | 4/2004 |
| WO | 2008033800 A2 | 3/2008 |
| WO | 2008115911 A1 | 9/2008 |

OTHER PUBLICATIONS

"MPC Implementation Methods for the Optimization of the Response of Control Valves to Reduce Variability," Advanced Application Note 002 Rev A. (2007) Fisher-Rosemount Systems, Jan. 3, pp. 1-10.

"SCR, 400-csi Coated Catalyst," Leading NOx Control Technologies Status Summary, 1 page prior to Feb. 2, 2005.

Advanced Petroleum-Based Fuels-Diesel Emissions Control (APBF-DEC) Project, "Quarterly Update," No. 7, 6 pages, Fall 2002.

Alberto Bemporad, "Model Predictive Control Design: New Trends and Tools", Proceedings of 45th IEEE Conference on Decision & Control, pp. 6678-6683, Dec. 13-15, 2006.

Allanson, et al., "Optimizing the Low Temperature Performance and Regeneration Efficiency of the Continuously Regenerating Diesel Particulate Filter System," SAE Paper No. 2002-01-0428, 8 pages, Mar. 2002.

Amstuz, et al., "EGO Sensor Based Robust Output Control of EGR in Diesel Engines," IEEE TCST, vol. 3, No. 1, 12 pages, Mar. 1995.

Axehill et al., "A Dual Gradiant Projection Quadratic Programming Algorithm Tailored for Model Predictive Control," Proceedings of the 47th IEEE Conference on Decision and Control, Cancun Mexico, pp. 3057-3064, Dec. 9-11, 2008.

Axehill et al., "A Dual Gradient Projection Quadratic Programming Algorithm Tailored for Mixed Integer Predictive Control," Technical Report from Linkopings Universitet, Report No. Li-Th-ISY-R-2833, 58 pages, Jan. 31, 2008.

Baffi et al., "Non-Linear Model Based Predictive Control Through Dynamic Non-Linear Partial Least Squares," Trans IChemE, vol. 80, Part A, pp. 75-86, Jan. 2002.

Bemporad, A. et al., "Model Predictive Control Based on Linear Programming—The Explicit Solution," IEEE Transactions on Automatic Control Dec. 2002, 47(12):1974-1985.

Bemporad, A. et al., "Model Predictive Control Toolbox™ Release Notes," Math Works Inc., Natick, MA Oct. 2008.

Bemporad, A. et al., "The explicit linear quadratic regulator for constrained systems," Automatica (2002) 38:3-20.

(56) References Cited

OTHER PUBLICATIONS

Bemporad, A. et al., Model Predictive Control Toolbox™ 3 User's Guide (2008) Matlab Mathworks, Natick, MA.
Bemporad, et al., "Explicit Model Predictive Control," 1 page, prior to Feb. 2, 2005.
Bertsekas, "On the Goldstein-Levitin-Polyak Gradient Projection Method," IEEE Transactions on Automatic Control, vol. AC-21, No. 2, pp. 174-184, Apr. 1976.
Bertsekas, "Projected Newton Methods for Optimization Problems with Simple Constraints," SIAM J. Control and Optimization, vol. 20, No. 2, pp. 221-246, Mar. 1982.
Boom et al., "MPC for Max-Plus-Linear Systems: Closed-Loop Behavior and Tuning", Jun. 2001, Proceedings of the 2001 American Control Conference, Arlington, VA, pp. 325-300.
Borrelli, "Constrained Optimal Control of Linear and Hybrid Systems," Lecture Notes in Control and Information Sciences, vol. 290, 2003.
Borrelli, F. et al., "An MPC/Hybrid System Approach to Traction Control," IEEE Transactions on Control Systems Technology (2006) 14(3):541-552.
Borrelli, F., "Constrained Optimal Control of Linear and Hybrid Systems," Lecture Notes in Control and Information Sciences Feb. 20, 2003, Springer, Berlin.
Borrelli, F., "Discrete Time Constrained Optimal Control," A dissertation submitted to the Swiss Federal Instituted of Technology (ETH) Oct. 9, 2002, Zurich, Diss. ETH No. 14666.
Bunting, "Increased Urea Dosing Could Cut SCR Truck Running Costs", http://www.automotiveworld.com/article/85897-increased-urea-dosing-could-cut-scr-truck-running-costs, Automotive World, 3 pages, Feb. 24, 2011, printed Mar. 2, 2011.
Catalytica Energy Systems, "Innovative NOx Reduction Solutions for Diesel Engines," 13 pages, 3rd Quarter, 2003.
Chatterjee, et al. "Catalytic Emission Control for Heavy Duty Diesel Engines," JM, 46 pages, prior to Feb. 2, 2005.
De Oliveira, "Constraint Handling and Stability Properties of Model Predictive Control," Carnegie Institute of Technology, Department of Chemical Engineering, Paper 197, 64 pages, Jan. 1, 1993.
De Schutter et al., "Model Predictive Control for Max-Min-Plus-Scaling Systems," Proceedings of the 2001 American Control Conference, Arlington, VA pp. 319-324, Jun. 2001.
Delphi, Delphi Diesel NOx Trap (DNT), 3 pages, Feb. 2004.
Diehl et al., "Efficient Numerical Methods for Nonlinear MPC and Moving Horizon Estimation," Int. Workshop on Assessment and Future Directions of NMPC, 24 pages, Pavia, Italy, Sep. 5-9, 2008.
Dunbar, "Model Predictive Control: Extension to Coordinated Multi-Vehicle Formations and Real-Time Implementation," CDS Technical Report 01-016, 64 pages, Dec. 7, 2001.
GM "Advanced Diesel Technology and Emissions," powertrain technologies—engines, 2 pages, prior to Feb. 2, 2005.
Guerreiro et al., "Trajectory Tracking Nonlinear Model Predictive Control for Autonomous Surface Craft," Proceedings of the European Control Conference, Budapest, Hungary, 6 pages, Aug. 2009.
Guzzella, et al., "Control of Diesel Engines," IEEE Control Systems Magazine, pp. 53-71, Oct. 1998.
Havelena, "Componentized Architecture for Advanced Process Management," Honeywell International, 42 pages, 2004.
Hiranuma, et al., "Development of DPF System for Commercial Vehicle—Basic Characteristic and Active Regeneration Performance," SAE Paper No. 2003-01-3182, Mar. 2003.
Honeywell, "Profit Optimizer a Distributed Quadratic Program (DQP) Concepts Reference," 48 pages, prior to Feb. 2, 2005.
http://www.not2fast.wryday.com/turbo/glossary/turbo—glossary. shtml, "Not2Fast: Turbo Glossary," 22 pages, printed Oct. 1, 2004.
http://www.tai-cwv.com/sbl106.0.html, "Technical Overview—Advanced Control Solutions," 6 pages, printed Sep. 9, 2004.
International Application Status Report for WO 2008/033800.
International Search Report for Corresponding Serial No. EP10175270 dated Jan. 16, 2013.
Johansen, T. A. et al., "Hardware Architecture Design for Explicit Model Predictive Control," Proceedings of ACC (2006).
Johansen, T. A. et al., "Hardware Synthesis of Explicit Model Predictive Controllers," IEEE Transactions on Control Systems Technology (2007) vol. 15, No. 1, January.
Jonsson, "Fuel Optimized Predictive Following in Low Speed Conditions," Master's Thesis, 46 pages, Jun. 28, 2003.
Kelly, et al., "Reducing Soot Emissions from Diesel Engines Using One Atmosphere Uniform Glow Discharge Plasma," SAE Paper No. 2003-01-1183, Mar. 2003.
Keulen et al., "Predictive Cruise Control in Hybrid Electric Vehicles", May 2009, World Electric Journal, vol. 3, ISSN 2032-6653.
Kolmanovsky, et al., "Issues in Modeling and Control of Intake Flow in Variable Geometry Turbocharged Engines", 18th IFIP Conf. System Modeling and Optimization, pp. 436-445, Jul. 1997.
Kulhavy, et al. "Emerging Technologies for Enterprise Optimization in the Process Industries," Honeywell, 12 pages, Dec. 2000.
Locker, et al., "Diesel Particulate Filter Operational Characterization," Corning Incorporated, 10 pages, prior to Feb. 2, 2005.
Lu, "Challenging Control Problems and Engineering Technologies in Enterprise Optimization," Honeywell Hi-Spec Solutions, 30 pages, Jun. 4-6, 2001.
Maciejowski, J. M., Predictive Control with Constraints (2002) Prentice Hall, Pearson Education Limited, Harlow, England.
Mariethoz, S. et al., "Sensorless Explicit Model Predictive Control of the DC-DC Buck Converter with Inductor Current Limitation," Applied Power Electronics Conference and Exposition, Twenty-Third IEEE APEC (2008) pp. 1710-1715.
Marjanovic, O. et al., "Towards a Simplified Infinite Horizon Model Predictive Controller," Proceedings of the 5th Asian Control Conference, Jul. 20-23, 2004.
Mayne, D. Q. et al., "Constrained model predictive control: Stability and optimality," Automatica (2000) 36:789-814.
Mehta, "The Application of Model Predictive Control to Active Automotive Suspensions," 56 pages, May 17, 1996.
Moore, "Living with Cooled-EGR Engines," Prevention Illustrated, 3 pages, Oct. 3, 2004.
Murayama et al., "Speed Control of Vehicles with Variable Valve Lift Engine by Nonlinear MPC," ICROS-SICE International Joint Conference, pp. 4128-4133, 2009.
National Renewable Energy Laboratory (NREL), "Diesel Emissions Control—Sulfur Effects Project (DECSE) Summary of Reports," U.S. Department of Energy, 19 pages, Feb. 2002.
Ortner, P. et al., "MPC for a Diesel Engine Air Path using an Explicit Approach for Constraint Systems," Proceedings of the 2006 IEEE, International Conference on Control Applications (2006) Munich, Germany, Oct. 4-6, pp. 2760-2765.
Ortner, P. et al., "Predictive Control of a Diesel Engine Air Path," IEEE Transactions on Control Systems Technology (2007) 15(3):449-456.
Pannocchia, G. et al., "Combined Design of Disturbance Model and Observer for Offset-free Model Predictive Control," IEEE Trans. on Automatic Control (2007) 52(6).
Patrinos et al., "A Global Piecewise Smooth Newton Method for Fast Large-Scale Model Predictive Control," Tech Report TR2010-02, National Technical University of Athens, 23 pages, 2010.
Qin, S. J. et al., "A survey of industrial model predictive control technology," Control Engineering Practice (2003) 11:733-764.
Rajamani, "Data-based Techniques to Improve State Estimation in Model Predictive Control," Ph.D. Dissertation, 257 pages, 2007.
Rawlings, J. B., "Tutorial Overview of Model Predictive Control," IEEE Control Systems Magazine (Jun. 2000), pp. 38-52.
Salvat, et al., "Passenger Car Serial Application of a Particulate Filter System on a Common Rail Direct Injection Engine," SAE Paper No. 2000-01-0473, 14 pages, Feb. 2000.
Schäuffele, J. et al., Automotive Software Engineering Principles, Processes, Methods, and Tools (2005) SAE International, Warrendale, PA.
Schutter et al., "Model Predictive Control for Max-Min-Plus-Scaling Systems", Jun. 2001, Proceedings of the 2001 American Control Conference, Arlington, VA, pp. 319-324.
Search Report for Corresponding EP Application No. 11167549.2 dated Nov. 27, 2012.

(56) References Cited

OTHER PUBLICATIONS

Shamma, et al. "Approximate Set-Valued Observers for Nonlinear Systems," IEEE Transactions on Automatic Control, vol. 42, No. 5, May 1997.

Soltis, "Current Status of NOx Sensor Development," Workshop on Sensor Needs and Requirements for PEM Fuel Cell Systems and Direct-Injection Engines, 9 pages, Jan. 25-26, 2000.

Stefanopoulou, et al., "Control of Variable Geometry Turbocharged Diesel Engines for Reduced Emissions," IEEE Transactions on Control Systems Technology, vol. 8, No. 4, pp. 733-745, Jul. 2000.

Stewart, G. et al., "A Model Predictive Control Framework for Industrial Turbodiesel Engine Control," in Proc. 47th IEEE Conf. on Decision and Control (2008) Mexico, December.

Stewart, G. et al., "A Modular Model Predictive Controller for Turbodiesel Problems," First Workshop on Automotive Model Predictive Control, Schloss Muhldorf, Feldkirchen, Johannes Kepler University Linz (2009).

Storset, et al., "Air Charge Estimation for Turbocharged Diesel Engines," vol. 1 Proceedings of the American Control Conference, 8 pages, Jun. 28-30, 2000.

Takacs et al., "Newton-Raphson Based Efficient Model Predictive Control Applied on Active Vibrating Structures," Proceeding of the European Control Conference 2009, Budapest, Hungary, pp. 2845-2850, Aug. 23-26, 2009.

The MathWorks, "Model-Based Calibration Toolbox 2.1 Calibrate complex powertrain systems," 4 pages, prior to Feb. 2, 2005.

The MathWorks, "Model-Based Calibration Toolbox 2.1.2," 2 pages, prior to Feb. 2, 2005.

Theiss, "Advanced Reciprocating Engine System (ARES) Activities at the Oak Ridge National Lab (ORNL), Oak Ridge National Laboratory," U.S. Department of Energy, 13 pages, Apr. 14, 2004.

Tøndel, P. et al., "An algorithm for multi-parametric quadratic programming and explicit MPC solutions," Automatica (2003) 39:489-497.

Van Basshuysen et al., "Lexikon Motorentechnik," (Dictionary of Automotive Technology) published by Vieweg Verlag, Wiesbaden 039936, p. 518, 2004. (English Translation).

Van Den Boom et al., "MPC for Max-Plus-Linear Systems: Closed-Loop Behavior and Tuning," Proceedings of the 2001 American Control Conference, Arlington, VA, pp. 325-330, Jun. 2001.

Van Keulen et al., "Predictive Cruise Control in Hybrid Electric Vehicles," World Electric Vehicle Journal vol. 3, ISSN 2032-6653, pp. 1-11, 2009.

Wang et al., "Fast Model Predictive Control Using Online Optimization," Proceedings of the 17th World Congress, the International Federation of Automatic Control, Seoul, Korea, pp. 6974-6979, Jul. 6-11, 2008.

Wang et al., "PSO-Based Model Predictive Control for Nonlinear Processes," Advances in Natural Computation, Lecture Notes in Computer Science, vol. 3611/2005, 8 pages, 2005.

Wright, "Applying New Optimization Algorithms to Model Predictive Control," 5th International Conference on Chemical Process Control, 10 pages, 1997.

Zavala et al., "The Advance-Step NMPC Controller: Optimality, Stability, and Robustness," Automatica, vol. 45, pp. 86-93, 2009.

Zeilinger et al., "Real-Time MPC—Stability Through Robust MPC Design," Joint 48th IEEE Conference on Decision and Control and 28th Chinese Control Conference, Shanghai, P.R. China, pp. 3980-3986, Dec. 16-18, 2009.

Zelenka, et al., "An Active Regeneration as a Key Element for Safe Particulate Trap Use," SAE Paper No. 2001-0103199, 13 pages, Feb. 2001.

Zhu, "Constrained Nonlinear Model Predictive Control for Vehicle Regulation," Dissertation, Graduate School of the Ohio State University, 125 pages, 2008.

\* cited by examiner

METHOD AND SYSTEM FOR UPDATING TUNING PARAMETERS OF A CONTROLLER

This application is a continuation of co-pending U.S. patent application Ser. No. 12/565,873, filed Sep. 24, 2009, and entitled "METHOD AND SYSTEM FOR UPDATING TUNING PARAMETERS OF A CONTROLLER", which is incorporated herein by reference.

TECHNICAL FIELD

Embodiments are generally related to control systems and controller devices. Embodiments are additionally related to MPC (Model-based Predictive Control) methods and systems. Embodiments also relate in general to the field of computers and similar technologies and, in particular to, software utilized in this field. In addition, embodiments relate to the updating of tuning parameters associated with controllers.

BACKGROUND OF THE INVENTION

A common approach utilized in advanced industrial control processes is Model-based Predictive Control, also known as "MPC". MPC involves the use of a controller that utilizes a mathematical model of a process to predict the future behavior of the control system and then formulates the control problem as a constrained optimization problem. The accuracy of the internal process model is crucial to the performance of a controller based on the solution of a constrained optimization problem.

MPC is thus a standard control and optimization technique utilized in process control such as, for example, power train control applications in diesel engines, turbocharger control solutions, and so forth. The acronym "MPC" therefore generally refers to a class of algorithms, which utilize an internal mathematical model of a controlled system and an optimization algorithm to compute optimal future control actions for system inputs and optimal trajectories at system outputs, for example, control actions for automotive system inputs.

Explicit MPC-based approaches require a large amount of data that is descriptive of a resulting control law. Consequently, a large amount of data is required to be transferred to and stored in an embedded system. Typically, for any change associated with plant models, weightings or other parameters in a cost function of an optimization problem, the solution must be recalculated and a set of data, which describe the solution, regenerated. The resulting set of data may then be redeployed to an embedded system or other types of computer platforms. Note that the term "platform" as utilized herein may also refer to a "real-time target platform" or a "real-time platform" or a "real-time target".

Currently, the procedure for updating control law information requires recompilation of a controller code along with a solution data set and redeployment of the compiled controller code. Frequent re-tuning of the controller during a development phase is always a necessity and presents a problem; hence, re-compilation and redeployment of the controller consumes a great deal of time during the development and test phases. For example, currently, if there are required ten tuning iterations, the controller needs to be recompiled ten times.

FIG. 1 illustrates a prior art update process diagram for an MPC-based controller or explicit MPC based controller 100 residing on a platform 145 in which tuning parameters of a controller (not shown in FIG. 1) are updated. FIG. 1 depicts the use of an application A1 107 associated with the update process for MPC based controller or explicit MPC-based controller 100. The application 107 (A1) can be employed to modify data sets for use in generating a controller data set 109 (DS1) that defines control laws, models, and parameters for the bank of observers. The newly generated data set(s) 109 can be embedded in association with a controller template code 110. The controller template code 110 can be compiled with specific data set(s) 109 via a compiler 120 and the resulting code compiled with data sets 125 may be further fed as input to an ECU (Electronic Control Unit) 145 via a communications channel 135 by terminating the test at an engine associated with an engine test cell 147. The resulting code may be deployed in the context of a software application in the loop and/or actual hardware in the loop testing platforms.

Such a prior art approach provides a fixed structure of the source code and is referred to as a "template"; however, such an approach does not free a practitioner from recompiling the controller code for a controller residing on platform 145 at each change of the tuning parameters or modifications of plant models. This hinders the possibility of tuning the controller residing on platform 145 seamlessly in a manner that the practitioner can take advantage of simultaneously tune parameters and monitor the changed behavior of the closed loop system 140.

Based on the foregoing, it is believed that a need exists for an improved method and system for enabling seamless tuning of controllers such as, for example, an explicit MPC controller or a standard MPC controller. A need also exists for an improved method and system for updating the tuning parameters of controllers without repetitive compilation of the controller code, as described in greater detail herein.

BRIEF SUMMARY

The following summary is provided to facilitate an understanding of some of the innovative features unique to the present invention and is not intended to be a full description. A full appreciation of the various aspects of the embodiments disclosed herein can be gained by taking the entire specification, claims, drawings, and abstract as a whole.

It is, therefore, one aspect of the present invention to provide for an improved method and system for configuring a controller such as, for example, an explicit MPC controller, a MPC based controller, and/or non-MPC based controllers.

It is another aspect of the present invention to provide for an improved method and system for enabling seamless tuning of controllers such as, for example, explicit MPC controllers, a MPC based controllers, and/or non-MPC based controllers.

It is a further aspect of the present invention to provide for an improved method and system for updating the tuning parameters of a controller (e.g., explicit MPC controller, a MPC based controller, non-MPC based controllers, etc.) without repetitive compilation of a controller code.

The aforementioned aspects and other objectives and advantages can now be achieved as described herein. A system and method for updating tuning parameters and data sets associated with a controller without repetitive compilation of a controller code is disclosed. The datasets may be composed of information describing, for example, any of the following: controllers, plant models, tuning parameters, state space or parameter space partitions, etc.

The controller code represents an algorithm associated with the controller and can be compiled separately from one or more data sets indicative of an explicit control law associated with a model predictive controller optimization problem. The algorithm can be implemented in a programming language code suitable for implementation via an embedded platform or any other type of computer platforms. The data sets can be represented in a specified data structure and the variables associated with the data structure can be declared. The variables may be directly or indirectly accessible or visible from the controller template code variable space. A particular amount of memory may be pre-allocated for variables associated with the data structure. Such variables include complete data sets representing at least the control law, but also may include information related to, for example, any of the following: plant models, tuning parameters, state space or parameter space partitions, etc. The variables can be updated independently from changing the compiled code associated with the controller algorithm referring to the variables.

In one embodiment, an offline optimization application enables users to perform weighting tuning of an MPC optimization problem along with executing an offline parametric optimization algorithm and then generating data sets indicative of the explicit control law. In addition, the offline application provides data transfer of generated sets via a communication channel. The offline optimization application avoids the compilation of the controller template by storing the compiled controller template on an OEM (Original Equipment Manufacturer) platform and updating the control law data sets. Note that the term "OEM platform," as utilized herein, refers generally to an embedded platform or any other type of computer platform. A data loader and an additional pre-allocated memory unit can also be included to perform the tuning parameters update without halting the controller operation. The data loader can be utilized to copy the data sets between the memory units. Note that by the terms "memory units" or "memory unit," we consider any type of memory space or any type of pre-allocated memory space.

In another embodiment, the controller can be updated while the controller actively performs online in order to seamlessly update the controller data sets representing the control laws and the observers' data sets utilized for prediction in a MPC algorithm. A pair of controller instances can be implemented with respect to a real time target in order to seamlessly update the observers' data sets and guarantee a flawless transfer of data. The controllers can be switched between the pair of controller instances seamlessly with updated tuning data sets for both the control law and a bank of observers.

The approach described herein enables seamless tuning of a controller such as, for example, an explicit MPC-based controller or a MPC-based controller, via a development phase and a test phase associated with a plant model in an online application. A controller can be implemented such that the coded algorithm is unchanged, despite changes to the tuning parameters and the plant model. Such an approach enables repetitive tuning of the controller without repetitive compilation of the controller code. The compiled code can be downloaded to an ECU (Electronic Control Unit) or any other type of computer platform that communicates electronically with, for example, a rapid prototyping system (or any other OEM computer platform). Such an approach represents a major time saving opportunity in the process of controller synthesis, calibration, and deployment with respect to the target ECU as well as a major time saving opportunity for the process of validation and fine tuning of a final controller design.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION

The particular values and configurations discussed in these non-limiting examples can be varied and are cited merely to illustrate at least one embodiment and are not intended to limit the scope thereof.

MPC (Model-based Predictive Control) is a control strategy based on the computation of a series of control actions by solving an optimization problem with respect to specified constraints on plant inputs and outputs and utilizing the knowledge of the plant models. The approach described herein enables repetitive tuning of a controller without repetitive compilation of the controller code. Reference is made generally to the use of MPC-based controllers such as explicit or traditional MPC controllers, but it can be appreciated that the disclosed embodiments may also apply to non-MPC based controllers, depending upon design considerations. The compiled code discussed herein may be downloaded to an ECU (Electronic Control Unit) or any other type of computer platform associated with, for example, a rapid prototyping system or an OEM computer platform, depending upon design considerations.

Figure 1:
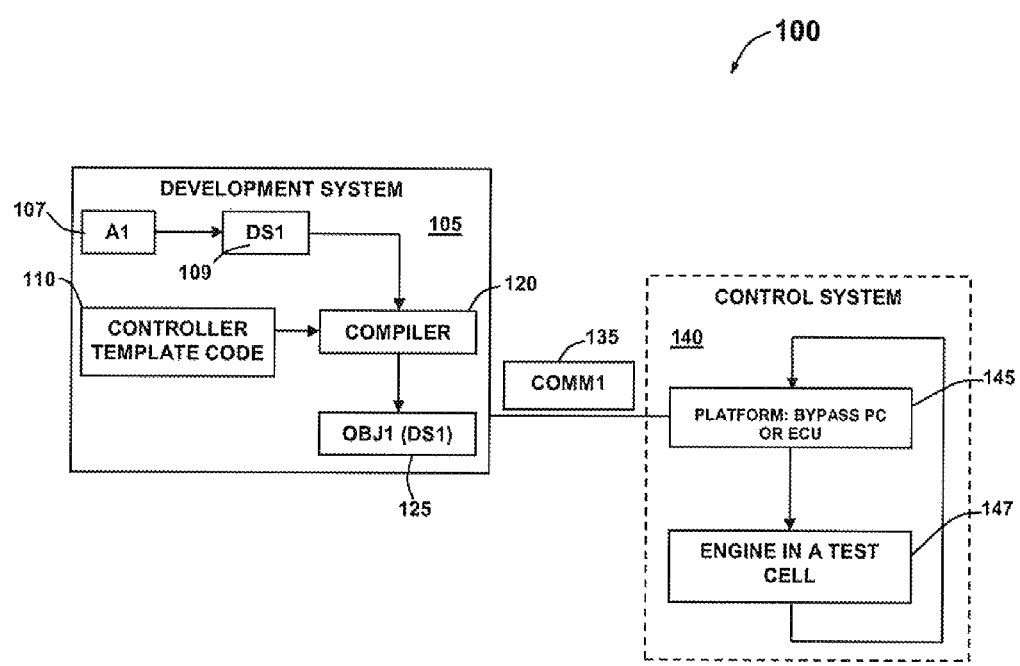
FIG. 1 illustrates a prior art process diagram for updating tuning parameters of a controller.
Figure 2:
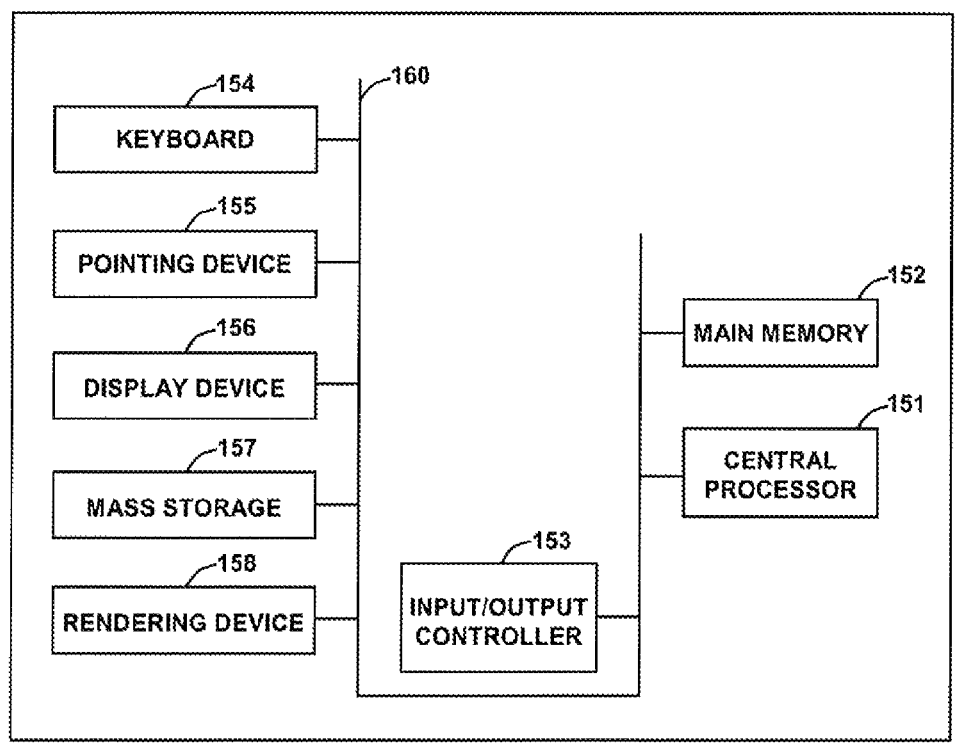
FIG. 2 illustrates a schematic view of a computer system in which the present invention may be embodied.

Note that the disclosed embodiments may be applied to any of a number of computing platforms. For example, the disclosed computer system such as data-process apparatus 150, as shown in FIG. 2, may be adapted for use as a development platform or an embedded platform or system that communicates with a controller platform. Note that as utilized herein the term "controller platform" can refer to any type of computer platform, where a controller resides. These two basic elements can communicate with one another through any type of electronic communications channel (e.g., wired communications, wireless communications, etc.).

Figure 3:
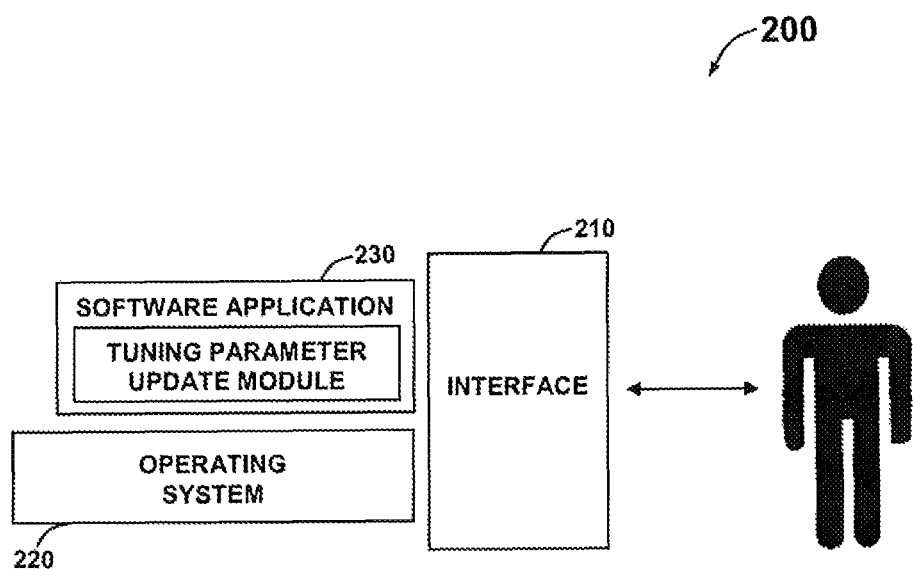
FIG. 3 illustrates a schematic view of a software system including an operating system, application software, and a user interface for carrying out the present invention.
Figure 4:
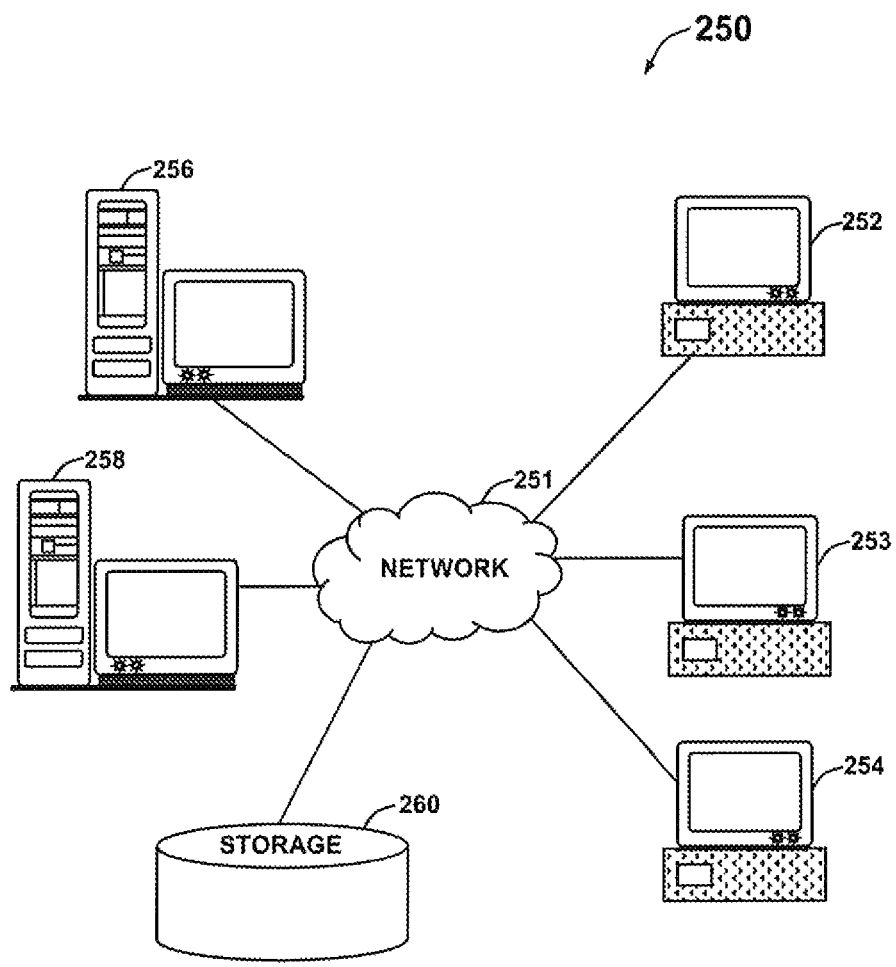
FIG. 4 illustrates a graphical representation of a network of data-processing systems in which aspects of the present invention may be implemented.

The following discussion with respect to FIGS. 2-4 is intended to provide a brief, general description of suitable computing environments in which the disclosed approach may be embodied. Although not required, the method and system herein can be described in the general context of computer-executable instructions, such as program modules, being executed by a single computer.

Generally, program "modules" include routines, programs, objects, components, data structures, etc., that perform particular tasks or implement particular abstract data types. Moreover, those skilled in the art will appreciate that the method and system may be practiced with other computer system configurations, including hand-held devices, multi-processor systems, microprocessor-based or programmable consumer electronics, networked PCs, minicomputers, mainframe computers, and the like.

FIGS. 2-4 are provided as exemplary diagrams of data processing environments in which embodiments of the present invention may be implemented. It should be appreciated that FIGS. 2-4 are only exemplary and are not intended to assert or imply any limitation with regard to the environments in which aspects or embodiments of the present invention may be implemented. Many modifications to the depicted environments may be made without departing from the spirit and scope of the present invention.

As depicted in FIG. 2, the embodiments may be implemented in the context of a data-processing apparatus 150 comprising a central processor 151, a main memory 152, an input/output controller 153, a keyboard 154, a pointing device 155 (e.g., mouse, track ball, pen device, or the like), a display device 156, and a mass storage 157 (e.g., hard disk). Additional input/output devices, such as a rendering device 158, may be included in the data-processing apparatus 150 as desired. Note that the rendering device 158 may constitute, for example, a printer, a copier, fax machine, scanner, and/or other types of rendering components, depending upon design considerations. As illustrated, the various components of the data-processing apparatus 150 may communicate through a system bus 160 or similar architecture. It can be appreciated that the data-processing apparatus 150 may be in some embodiments, other types of computing devices such as, for example, a mobile computing device such as a Smartphone, a laptop computer, iPhone, etc. In other embodiments, data-processing apparatus 150 may function as a desktop computer, server, and the like, depending upon design considerations.

FIG. 3 illustrates a computer software system 200 for directing the operation of the data-processing apparatus 150 depicted in FIG. 2. Software application 230, which is stored in main memory 152 and on mass storage 157, includes a kernel or operating system 220 and a shell or interface 210. One or more application programs, such as application software 230, may be "loaded" (i.e., transferred from mass storage 157 into the main memory 152) for execution by the data-processing apparatus 150. The data-processing apparatus 150 receives user commands and data through user interface 210; these inputs may then be acted upon by the data-processing apparatus 150 in accordance with instructions from operating module 220 and/or application module 230.

Note that the term "module" as utilized herein may refer to a collection of routines and data structures that perform a particular task or implements a particular abstract data type. Modules may be composed of two parts: an interface, which lists the constants, data types, variable, and routines that can be accessed by other modules or routines; and an implementation, which is typically private (accessible only to that module) and which includes source code that actually implements the routines in the module. The term "module" may also simply refer to an application such as a computer program design to assist in the performance of a specific task, such as word processing, accounting, inventory management, etc.

The interface 210, which is preferably a graphical user interface (GUI), also serves to display results, whereupon the user may supply additional inputs or terminate the session. In an embodiment, operating system 220 and interface 210 can be implemented in the context of a "Windows" system. It can be appreciated, of course, that other types of systems are possible. For example, rather than a traditional "Windows" system, other operation systems such as, for example, Linux may also be employed with respect to operating system 220 and interface 210. The tuning parameters update module 230 can be adapted for updating the tuning parameters associated with a controller while actively operating on-line without recompilation. Application module 230, on the other hand, can include instructions such as the various operations described herein with respect to the various components and modules described herein such as, for example, the method 350 depicted in FIG. 7.

FIG. 4 depicts a graphical representation of a network of data processing system 250 in which aspects of the present invention may be implemented. Network data processing system 250 is a network of computers in which embodiments of the present invention may be implemented. Network data processing system 250 contains network 251, which is the medium used to provide communications links between various devices and computers connected together within network data processing system 250. Network 251 may include connections such as wire, wireless communication links, or fiber optic cables.

In the depicted example, server 256 and server 258 connect to network 251 along with storage unit 260. In addition, clients 252, 253, and 254 connect to network 251. These clients 252, 253, and 254 may be, for example, personal computers or network computers. Data-processing apparatus 150 depicted in FIG. 2 can be, for example, a client such as client 252, 253, and/or 254. Alternatively, data-processing apparatus 150 can be implemented as a server such as servers 256 and/or 258, depending upon design considerations.

In the depicted example, server 258 provides data such as boot files, operating system images, and applications to clients 252, 253, and 254. Clients 252, 253, and 254 are clients to server 258 in this example. Network data processing system 250 may include additional servers, clients, and other devices not shown. Specifically, clients may connect to any member of a network of servers which provide equivalent content.

In the depicted example, network data processing system 250 is the Internet with network 251 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, government, educational, and other computer systems that route data and messages. Of course, network data processing system 250 also may be implemented as a number of different types of networks such as, for example, an intranet, a local area network (LAN), or a wide area network (WAN). FIG. 2 is intended as an example and not as an architectural limitation for different embodiments of the present invention.

The following description is presented with respect to embodiments of the present invention, which can be embodied in the context of a data-processing system such as data-processing apparatus 150, computer software system 200, data processing system 250, and network 251 depicted respectively FIGS. 2-4. The present invention, however, is not limited to any particular application or any particular environment. Instead, those skilled in the art will find that the system and methods of the present invention may be advantageously applied to a variety of system and application software including database management systems, word processors, and the like. Moreover, the present invention may be embodied on a variety of different platforms including Macintosh, UNIX, LINUX, and the like. Therefore, the description of the exemplary embodiments, which follows, is for purposes of illustration and not considered a limitation.

Figure 5:
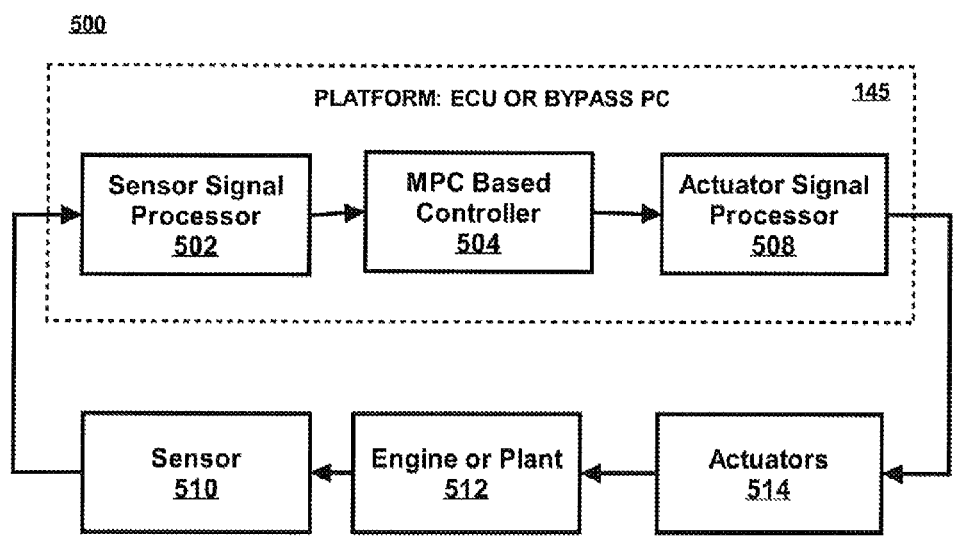
FIG. 5 illustrates a schematic block diagram of a general control system associated with a MPC controller or explicit MPC controller or any other type of controller in accordance with embodiments of the present invention.

FIG. 5 illustrates a general control system 500 that includes a MPC based controller 504 which resides on a platform 145 (e.g., an ECU, ByPass PC, or any other computer type). Note that by the term "MPC based controller" as utilized herein, we consider both an explicit MPC controller, where a computation of a MPC optimization problem is solved off-line and in the form of an explicit control law; and a MPC based controller, wherein the computation of the MPC optimization problem is performed on-line during each sampling period. The latter type of MPC based controller can also be referred to as a "traditional MPC controller" herein, which is a term widely utilized in the process industry. Note that an explicit MPC controller is more suitable for use with an embedded control application such as control solutions in the automotive industry.

Note that in FIGS. 1-12, identical or similar blocks are generally indicated by identical reference numerals. As depicted in FIG. 5, a sensor signal processor 502 provides data to a MPC based controller 504. The controller 504 in turn provides an output that is then input to actuator signal processor 508. Data from the processor 508 is then provided to one or more actuators 514 whose output is input to an engine/plant 512. Signal output from the engine/plant 512 can be then provided to the sensor 510, which in turn provides sensor signals to the sensor signal processor 502.

Note that the disclosed approach can be effectively utilized for seamless tuning MPC-based controllers such as the controller 504 (which resides on the platform 145) via a development and a test phase associated with a plant/engine model. A development workstation such as the workstation 105 depicted in FIG. 6 communicates with the controller platform 145. The controller 504 can include an application A1 (see FIG. 6) that represents an application for explicit MPC based controller or MPC based controller 504 tuning and the generation of corresponding data set(s).

Data-processing apparatus 150 depicted in FIG. 2 can be employed, for example, as the development workstation 105. The application A1 107 can be modified in order to generate controller data sets DS1 109 that defines control laws and bank of observer data sets. The data sets DS1 109 can be passed to a platform 145 via a communication channel 135. Further, a controller template code 110 representing algorithm of the controller 504 residing on platform 145 can be compiled via a compiler 120. The controller code 110 representing the algorithm can be compiled separately from the data set DS1 109 representing a solution for a MPC optimization problem. The algorithm can be implemented in a programming language code suitable for implementation, for example, via a rapid prototyping system. The platform 145 may be configured to provide such a function, in certain instances.

The programming language code described herein can be, for example, a C programming language code or another appropriate programming language. It will be apparent to those skilled in the art that a number of language codes may be utilized as desired without departing from the scope and spirit of the disclosed embodiments. The platform 145 may be, for example, an OEM platform, an embedded platform, or a rapid prototyping system (e.g., dSpace, Mathworks RTW, etc). The MPC based controller 504 depicted at FIG. 5 resides on the platform 145. The control system 140 can include platform 145 which can be an ECU or a bypass personal computer where controller 504 resides and which is connected to a test cell 147 with an engine or other type of plant. The data sets DS1 109 can be represented in a specified data structure and the variables associated with the data structures can be declared. For example, the data sets DS1 109 can be specified by "typedef struct" in the C programming language. A certain amount of memory can be pre-allocated for the variables associated with the data structures. Such variables include complete data sets representing the control law. The variables can be updated independently from changing the compiled code associated with the controller algorithm that is referring to the variables.

FIG. 5 thus illustrates a schematic block diagram of a general control system 500 associated with a MPC based controller or an explicit MPC controller 504. The control system 500 can be adapted for use with MPC controller 504 for controlling, for example, an automotive system. The MPC controller 504 can include, for example, a model of the dynamic operation process of an automotive system. The control system 500 can also be configured to include a platform (e.g., an ECU or By-Pass PC) or any other computer type, connected to a plant, for example, or an engine (i.e., and sometimes transmission, emissions after treatment device, brake or other automotive systems and/or components, etc.).

Figure 6:
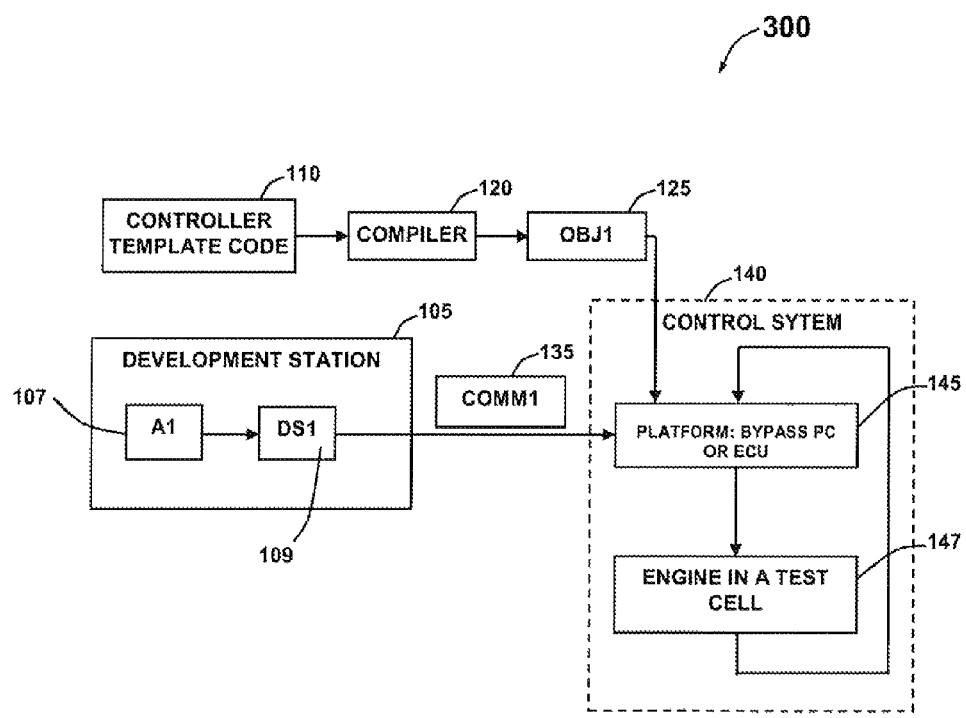
FIG. 6 illustrates a process diagram for updating tuning parameters in a controller such as, for example, an explicit MPC controller or a MPC-based controller, in accordance with an embodiment.

FIG. 6 illustrates a diagram of a process 300 for updating tuning parameters in a controller such as, for example, an explicit MPC controller or a MPC-based controller, in accordance with an embodiment. In general, data form a controller template code is fed to the compiler 120, which in turn produces a compiled code 125 (i.e., OBJ1 in FIG. 6) that is supplied to the control system 140 and specifically, the platform 145. Data from platform 145 can be provided to, for example, an engine in a test cell 147, whose output is then provided as feedback back to the platform 145. The development station 105 discussed herein can additionally provide data and instructions via a communications link 135 (COMM1) to the platform 145. As indicated herein, the development station 105 generally includes an application A1 107 and data set(s) D1 109, which are discussed in greater detail herein. Note that the software application 230 depicted in FIG. 3 is analogous to the application A1 illustrated in FIG. 6. The software application 230 may optionally include a compiler for compiling a controller template (as discussed herein). The controller template code 110, the compiler 120, and the compiled code 125 (OBJ1) may also be deployed at the development station 105. In this manner, the compiler could be (but not necessarily) a part of the main off-line application and could additionally reside on the same development station.

Figure 7:
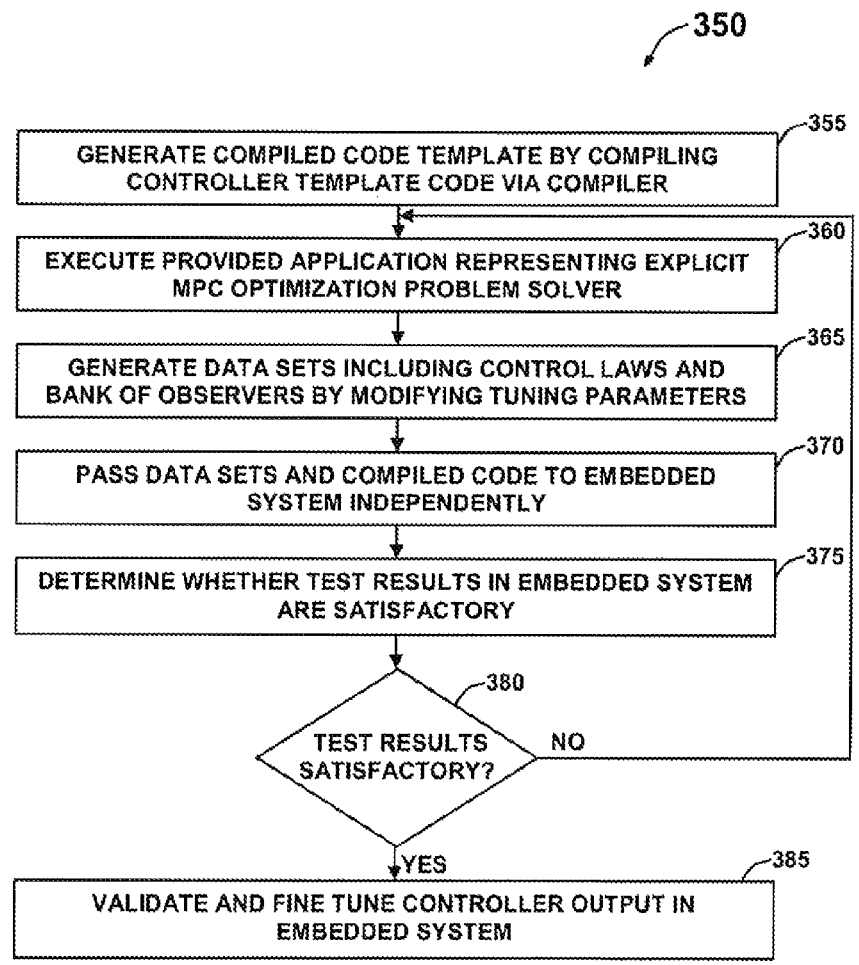
FIG. 7 illustrates a high level flow chart of operations illustrating operational steps of a method for updating tuning parameters in a controller such as, for example, an explicit MPC controller or a MPC-based controller, in accordance with an embodiment.

FIG. 7 illustrates a high level flow chart of operations illustrating operational steps of a method 350 for updating tuning parameters in the MPC controller 504 residing on platform 145, in accordance with an embodiment. The MPC controller 504 residing on platform 145 can be implemented such that the coded algorithm is unchanged despite of the changes of the tuning parameters and plant models. Initially, the compiled template 125 can be generated by compiling the controller template code 110 representing algorithm associated with the controller 504 residing on platform 145 via the compiler 120, as depicted at block 355. The compiled code 125 can be further provided to the platform 145 independently. The application A1 representing MPC optimization problem solver in the case of explicit MPC controller or some other tuning algorithm for the case of MPC-based controller can be provided for explicit MPC controller tuning and generating data sets DS1, as illustrated at block 360.

The application A1 can be utilized to generate one or more data sets DS1 representing the solution for the MPC optimization problem by modifying the tuning parameters, as indicated at block 365. Further, the data sets DS1 from the development workstation 105 can be passed to the platform 145 via the communication channel 135, as depicted at block 370. A determination can be made whether the test results for the control system 140 are satisfactory, as indicated at block 375. If the test results are satisfactory as depicted at block 380, the data sets DS1 can be validated and the compiled template 125 from the compiler 120 can be fine tuned, as illustrated at block 385. Else, the process can be continued from block 360. The method 350 described herein can therefore represent a major time saving opportunity in the process of controller synthesis, calibration, and deployment to the platform 145 as well as a major time saving opportunity for the process of validation and fine tuning of the final controller design and control system 140.

In one embodiment, the proposed method 350 can update the controller 504 residing on platform 145 with tuning parameters without performing re-compilation of the controller 504. Such an approach avoids compilation of the controller template by storing the compiled controller template on the platform 145 and updating only control law data sets. In another embodiment, the proposed method 350 can be provided with a data loader 460 and an additional pre-allocated memory unit in order to perform the tuning parameters update without stopping the controller operations. In another embodiment, the method 350 can update the controller 504 while the controller 504 residing on platform 145 is actively performing on-line in order to be able to seamlessly update both the controller data sets DS1 representing the control law and the observers' data sets utilized for prediction in MPC algorithm.

Figure 8:
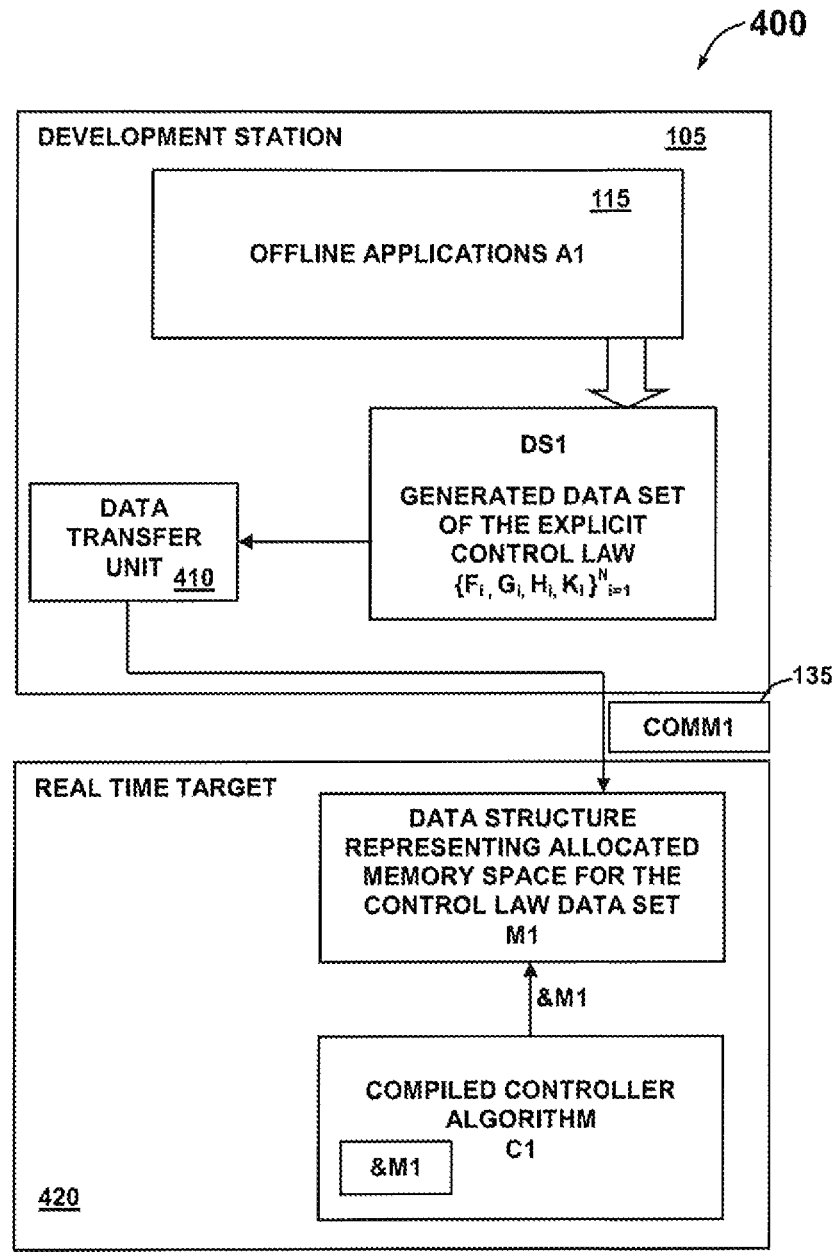
FIG. 8 illustrates a template structure for updating controller without performing recompilation, in accordance with an embodiment.

FIG. 8 illustrates a template structure 400 for updating the MPC controller 504 residing on platform 145 without performing recompilation, in accordance with an embodiment. The user associated with an offline application A1 can alter the tuning parameters of the MPC controller 504 as desired. The offline optimization application 115 (i.e., A1 in FIG. 8) permits users of the controller 504 residing on platform 145 to perform weighting tuning associated with the MPC optimization problem, executes offline parametric optimization algorithm, and generates the data set DS1 describing the explicit control law and observer data sets. The data sets DS1 describing the solutions for the MPC optimization problem can be represented as set of matrices $\{F_i, G_i, H_i, K_i\} N_{i=1}$, wherein the case of explicit MPC solution those matrices define resulting piecewise controller functions as a set of control laws over polyhedral sets. The generated data sets DS1 at the development station 105 can be further transferred to a data transfer unit 410. Further, the operation of the controller C1 can be terminated and the data sets DS1 from the data transfer unit 410 can be transferred to a real time target 420 via the data communication channel 135.

Note that the controller C1 described herein can be a MPC based controller 504 that was generated by the compiled code 125 independently. An appropriate communication can be established between the development computer station 105 and the real time target platform 420. The data sets DS1 that are transferred to the real time target platform 420 can be stored in a memory unit M1 which can be a series of data structures representing allocated memory space for the data sets DS1. Finally, the operations of the controller C1 can be resumed and the compiled code 125 from the controller C1 can be stored into the platform 145 independently. Such an approach avoids compilation of the controller template 110 by storing the compiled controller template 125 on the platform 145 and updating only the control law data sets DS1. However, the approach requires stopping of the controller operation and restart of the controller C1 repeatedly.

Figure 9:
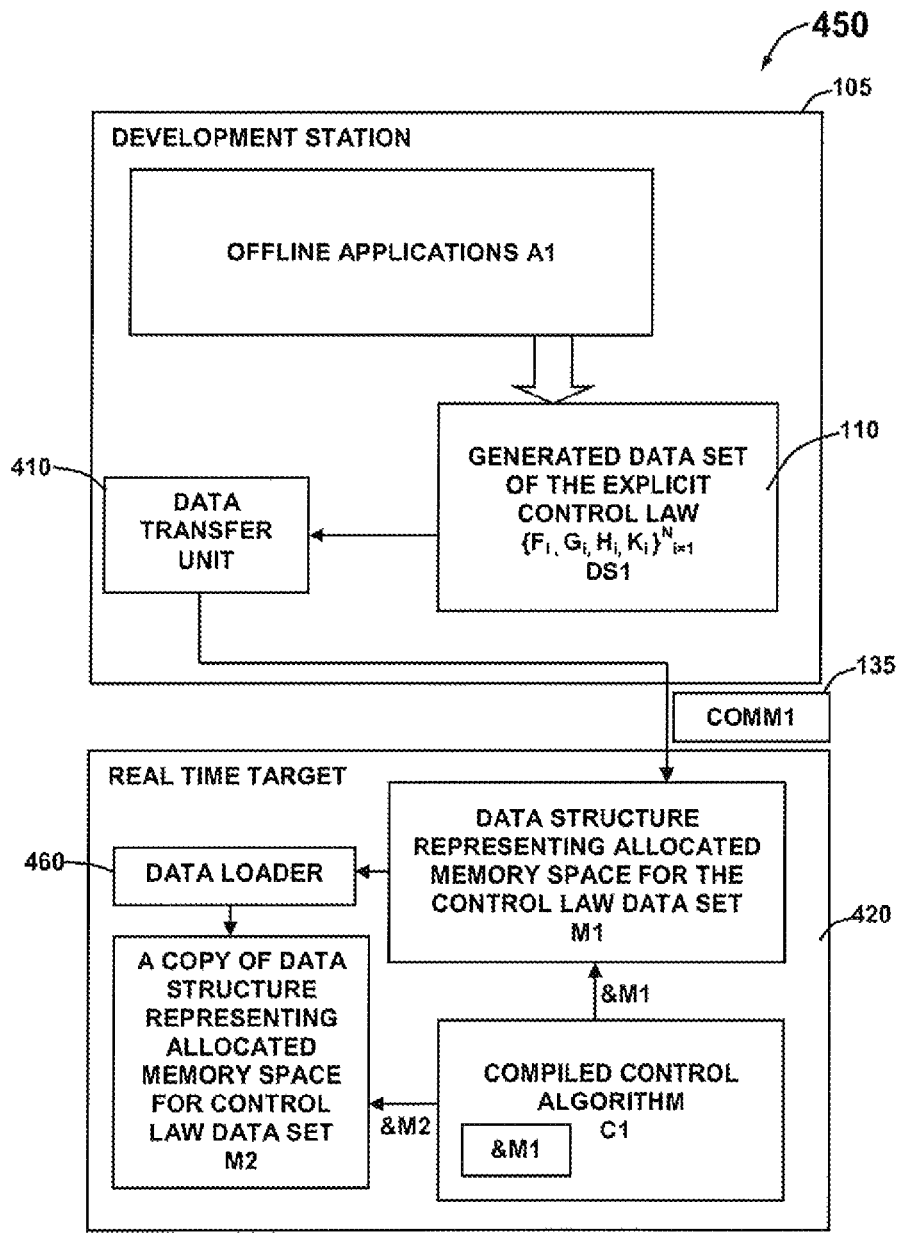
FIG. 9 illustrates a template structure for updating a controller without stopping the controller operation, in accordance with an embodiment.

FIG. 9 illustrates a template structure 450 for updating the MPC controller 504 residing on platform 145 without stopping the controller operations, in accordance with an embodiment. Again as reminder, in FIGS. 1-11 identical or similar blocks are generally indicated by identical reference numerals. A data loader 460 and an additional pre-allocated memory unit M2 can be included in association with the real time target platform 420 to perform the tuning parameters update without stopping the controller C1. Initially, the control law data sets that are stored in the memory unit M2 can be utilized by the controller C1 via a pointer &M2. The memory unit M2 includes a copy of data structure that represents allocated memory space for the control law data sets. The user associated with the offline application A1 change the tuning parameters as desired and a new set of data DS1 describing the explicit control law and observer data sets can be generated by A1. Thereafter, the data sets DS1 can be transferred to the memory unit M1 via the data transfer unit 410.

The controller C1 freezes its output temporarily and points to the memory unit M1 and starts utilizing the new control law data sets DS1 from the memory unit M1. The data loader 460 copies the new data sets DS1 from the memory unit M1 to the re-allocated memory unit M2. The controller C1 point back to the re-allocated memory unit M2 and continues utilizing the updated control law datasets from the re-allocated memory unit M2. The controller C1 can be seamlessly updated by a convenient manipulation of pointers &M1 and &M2 associated with the memory units M1 and M2. The control law data sets DS1 can be updated without stopping the controller C1. In addition, the observer data sets utilized within the controller C1 can be updated utilizing the template structure described in FIG. 9.

Figure 10:
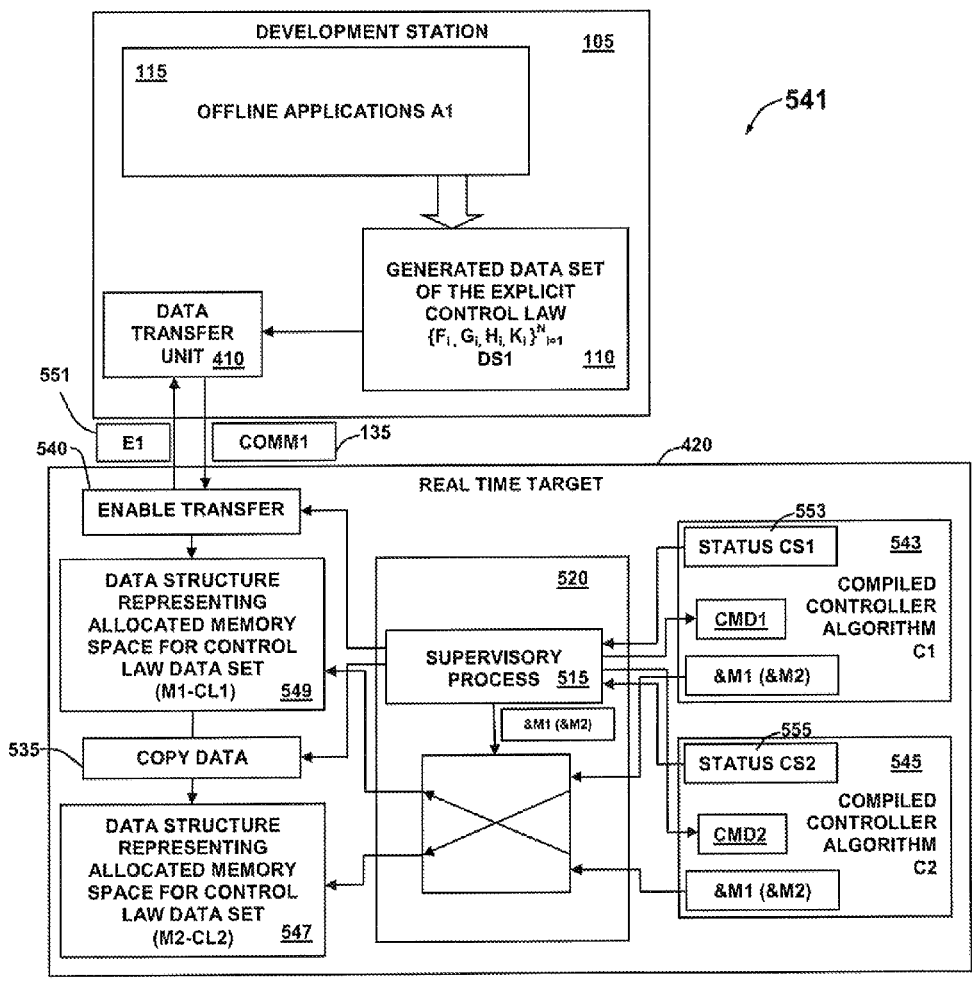
FIG. 10 illustrates a possible template structure for updating a controller while the controller is performing on-line, in accordance with an embodiment.

FIG. 10 illustrates a template structure 541 for updating the MPC controller 504 residing on platform 145 while the controller 504 is performing on-line, in accordance with an embodiment. The template structure 541 seamlessly updates the controller data set(s) DS1 representing control laws and the observer data sets without letting the system to "run loose" without having an active controller on-line. The template structure 541 seamlessly updates the controller data set(s) DS1 depicted at block 110, which represents control laws and observers' data sets utilized for prediction operations in the MPC algorithm. A pair of controllers 543 and 545 (respectively, C1 and C2) may be implemented with respect to the real time target platform 420 in order to seamlessly update the observers' data sets and guarantee a flawless transfer of data. Note that the real time target platform 420 represents an example of a software template having a particular structure and is also an example of an implementation of structure, in general. The real time target platform 420 includes elements such as enable transfer module 540, a memory unit (M1-CL1) 549, a memory unit (M2-CL2) 547, copy data module 535, a supervisory module 515, and controllers 543 and 545.

The elements associated with the real time target 420 may form a part of the template structure 541 that is required only once to be deployed on the platform 145.

A signal from the supervisory process 515 to the enable transfer process 540 may be utilized to enable or disable the data transfer from the offline application 115 (A1) to the real time target 420. Additionally, the signal from the supervisory process 515 to the copy data process 535 transfers data from memory 549 (M1-CL1) to memory 547 (M2-CL2), which may each constitute memory units. A permission signal 551 (E1) provides permission to the offline application 115 when it is safe to transfer the data set(s) 110 (DS1) from the development station 105 via the communication channel 135. The status signals 553 and 555 associated with the controllers 543 and 545 indicate the status of the controllers 543 and 545, respectively. The status signals 553 and 555 (respectively, CS1 and CS2) can provide signals such as "inactive", "active", "warming up", "active and able to go inactive", "inactive and able to go active" (i.e. warmed up) signals. CMD1 and CMD2 signals associated respectively with the controllers 543 and 545 represents the commands from the supervisory process 515 to the controllers 543 and 545, respectively. The commands CMD1 and CMD2 from the supervisory process 515 can be "go active", "go inactive", and "use (M1)", "use (M2)", and "warm up" commands.

Initially, the supervisory process 515 provides a "go active" signal to the first controller C1 and activates the first controller C1 while providing a "go inactive" signal to the second controller C2. The active controller C1 utilizes memory unit (M2-CL2) 547 for the data sets DS1. Further, the user associated with the offline application A1 115 can change the tuning parameters and a new data set DS1 describing the explicit control law and observer data sets can be generated by the offline application A1 115. The updated data sets DS1 from the development station 105 can be transferred to the first memory unit (M1-CL1) 549 via the communication channel 135, if the permission signal E1 551 is received.

The supervisory process 515 can instruct the second controller C2 545 to point to the first memory unit (M1-CL1) 549 with a "warm up" signal and waits for the second controller C2 545 to go to "warmed up" state. The supervisory process 515 initiates a sequence of commands after receiving "warmed up" signal from the controller C2 545 and an "active and ready to go inactive" signal from the controller C1 543. At this state, the controller C1 543 receives the "go inactive" signal and C2 545 receives a "go active" signal. Further, the supervisory process 515 transmits a command to the copy data process 535 to copy the updated data sets DS1 from first memory unit (M1-CL1) 549 to the second memory unit (M2-CL2) 547. Also, the controller C2 545 can be pointed towards the second memory unit (M2-CL2) 547. Note that such an approach does not disrupt the work flow of the active controller as both the memory units (M1-CL1) 549 and (M2-CL2) 547 includes the same data.

Figure 11:
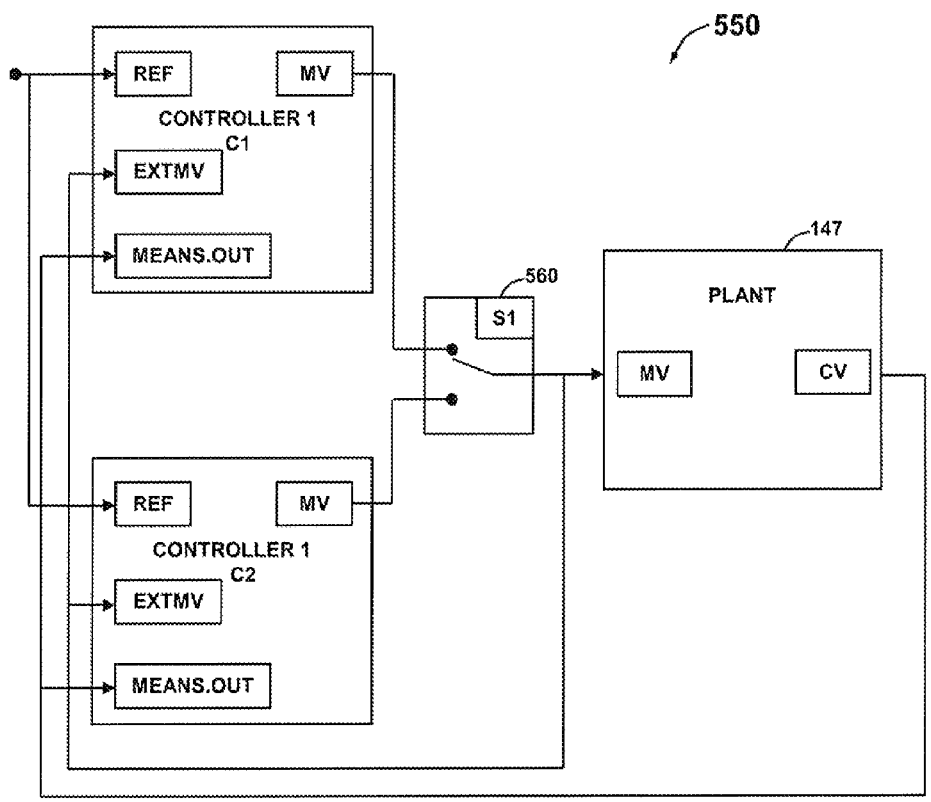
FIG. 11 illustrates a process diagram indicative of the bumpless switching of two (or more) controllers in the closed loop with a plant while actively operating on-line, in accordance with an embodiment.

FIG. 11 illustrates a process diagram depicting operations of a system 550 for the "bumpless" transfer of active controllers in the closed loop with e.g., plant 147, in accordance with an embodiment. Note that the term "bumpless transfer" refers to an existing practice and a solution that can be implemented independent of the procedure described in this section. The proposed approach can be utilized to switch between the first controller C1 and the second controller C2 seamlessly with updated tuning data sets for both control law and bank of observers. For example, consider the active controller C1, depicted at FIG. 9, is controlling the plant while the controller C2 is in "warm up" mode. A controller is in "warm up" mode if the controller follows external MV signals (ExtMV) in order to bring its bank of observers to follow the states of the actual plant. In this way, once the controller C2 is properly "warmed up" it is possible to activate the controller C2, i.e. bring the controller on-line, and de-active the controller C1 without having glitches in the MV signals.

Figure 12:
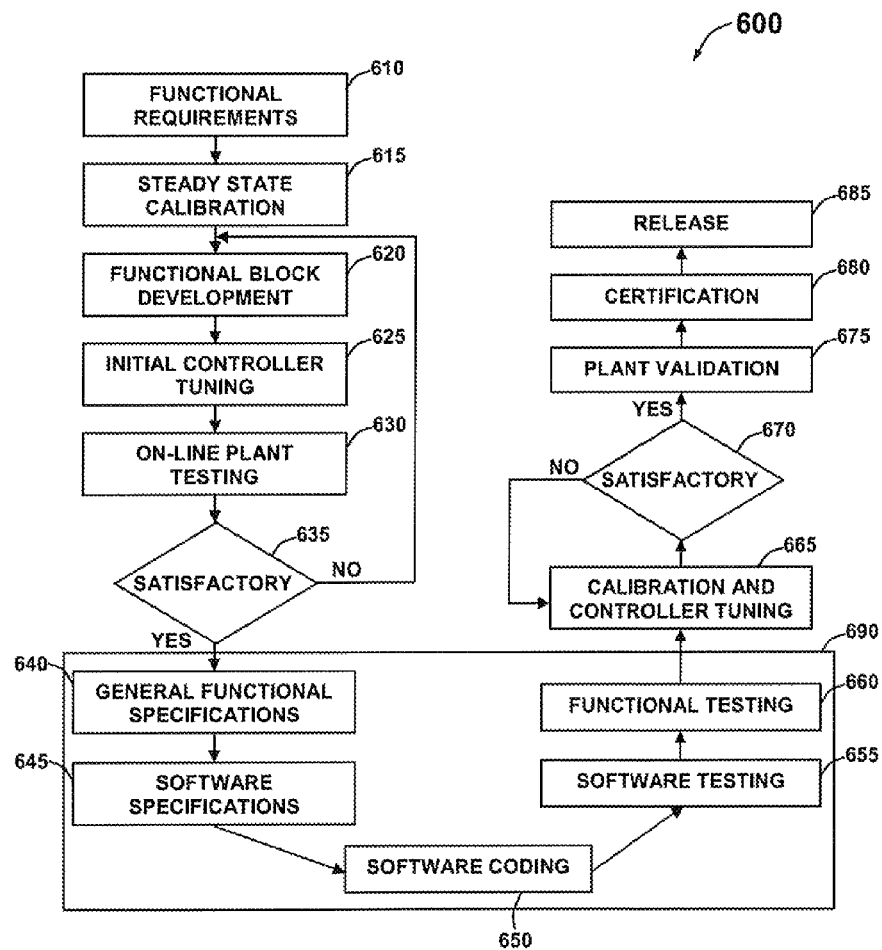
FIG. 12 illustrates a functional block diagram illustrating a method for updating tuning parameters in a controller, in accordance with an embodiment.

FIG. 12 illustrates a functional process diagram of a method 600 for updating tuning parameters with respect to the MPC controller 504 residing on platform 145, in accordance with an embodiment. Initially, the functional requirements for the desired control system performance can be analyzed and the offline application A1 representing the optimization problems solver in association with the controller 504 can be generated or configured, as depicted at block 610. Further, the steady state calibration Scan be determined independently of the tuning of the controller 504, as indicated at block 615. Further, based on the functional requirements and the steady state behavior of the plant in the test cell 147 or its dynamic nonlinear model, a functional block of controller 504 residing on platform 145 can be developed, as illustrated at block 620. The functional block can represent the fixed template, data sets DS1 including control law, and observer data sets. The functional block can include optimization solutions for the MPC controller problems. Based on the functional block, the controller 504 can be tuned with optimized parameters and the performance of the control system 140 can be tested, as indicated at blocks 625 and 630. The major time saving using the solutions described here can be expected in steps: 620, 625, 630 and 635.

Further, a determination can be made whether the performance of the plant at test stage is satisfactory, as depicted at block 635. If the test results are not satisfactory, the process can be continued from block 620. Else, a general functional specification can be coded for the functional block, as indicated at block 640. Thereafter, a software specification can be defined for the functional specifications, as indicated at block 645. Utilizing the general functional and software specification, a resulting software code can be coded, as indicated at block 650. The coded software can be tested and a functional testing can also be performed, as illustrated at blocks 655 and 660. Further, the coded software code can be utilized to calibrate and fine tune the controller 504 residing on platform 145, as depicted at block 665.

Note that the steps described herein with respect to block 690 relate generally to software coding operations that can be performed only once. Then, a fixed controller template may be obtained and in every next pass of the process 600, the procedure 690 may be omitted and a direct step from procedure 635 to procedure 665 can be performed.

A determination can be made whether the calibration and tuning parameters associated with the controller 504 on platform 145 are satisfactory, as shown at block 670. If the calibration and tuning parameters are not satisfactory, the process can be continued from block 665. Else, the data sets DS1 can be validated in the platform 145, as described at block 675. The major time saving using the solutions described here can be expected in steps: 665 and 670.

The compiled template code 125 with selected datasets and plant models that provide fine tuned version of the controller 504 can be certified, as indicated at block 680. Finally, the controlled code 125 with selected datasets and plant models providing fine tuned version of controller 504 can be released, as illustrated at block 685. After, a compiled version of the controller is obtained, it is not necessary to recompile the controller again. Such an approach enables repetitive tuning of the controller 504 without repetitive compilation of the controller code 110 and the compiled code 125 can be downloaded to the ECU associated with the platform 145. The one time compilation of the controller code 110 results in time and effort savings and reduces the chances for errors. Such an approach enables seamless transfer of the data sets DS1 describing plant models for the bank of the observers, resulting tuning parameters and/or resulting explicit control laws, and an uninterrupted operation of the controller 504 enabling a bumpless transfer in the operation of control system 500.

It will be appreciated that variations of the above-disclosed and other features and functions, or alternatives thereof, may be desirably combined into many other different systems or applications. For example, the disclosed embodiments may be applied to any type of controller, not merely MPC-based controllers such as traditional or explicit MPC controllers. Also, that various presently unforeseen or unanticipated alternatives, modifications, variations or improvements therein may be subsequently made by those skilled in the art which are also intended to be encompassed by the following claims.

What is claimed is:

1. A method for updating tuning parameters of a controller using a development station that is separate from but in operative communication with the controller, said method comprising:
   compiling a set of controller instructions to generate a compiled controller code, the compiled controller code including a control algorithm to control a dynamic operating process, the complied controller code comprising one or more references to a pre-allocated memory space that stores a data set that is not compiled, the data set comprising one or more tuning parameters for tuning the control algorithm of the compiled controller code;
   generating the data set using the development station;
   transferring the generated data set from the development station to the pre-allocated memory space;
   controlling the dynamic operating process using the control algorithm of the compiled controller code referencing the one or more tuning parameters of the data set;
   updating one or more of the tuning parameters of the data set using the development station during a tuning process of the controller and transferring one or more of the updated tuning parameters from the development station to the pre-allocated memory space without altering said compiled controller code in order to tune said control algorithm of the controller without performing a recompilation of the compiled controller code; and
   controlling the dynamic operating process using the control algorithm of the compiled controller code referencing the one or more updated tuning parameters.

2. The method of claim 1, wherein the data set has a predefined data structure.

3. The method of claim 2, wherein the data set further has one or more declared variables.

4. The method of claim 1, wherein the data set includes one or more variables, and the compiled controller code includes a variable space, wherein the one or more variables of the data set are directly or indirectly accessible via the compiled controller code variable space.

5. The method of claim 1, wherein the data set includes one or more variables that influence the control algorithm of the compiled controller code.

6. The method of claim 5, wherein the one or more variables of the data set define, at least in part, one or more of the tuning parameters, a state space and/or one or more parameter space partitions for the compiled controller code.

7. The method of claim 1, wherein said controller comprises a MPC-based controller.

8. The method of claim 7, wherein said MPC-based controller comprises an explicit MPC-based controller.

9. The method of claim 1, wherein said controller is an embedded controller.

10. The method of claim 1, further comprising repeatedly updating using the development station one or more of the tuning parameters of the data set during the tuning process of the controller without halting operation of the compiled controller code.

11. The method of claim 10, wherein the data set is generated using an offline optimization process using the development station.

12. The method of claim 10, wherein repeatedly updating one or more of the tuning parameters of the data set during the tuning process of the controller comprises configuring a data loader and a first memory unit, wherein said data loader copies the data set from said first memory unit to the pre-allocated memory space.

13. A method for updating tuning parameters of a controller using a development station that is separate from but in operative communication with the controller, said method comprising:
   loading a compiled controller code onto the controller for execution by the controller, the compiled controller code including a control algorithm to control a dynamic operating process of a system, the compiled controller code declaring a number of variables that are associated with a data set, wherein the data set is not compiled;
   generating the data set using a development station, the data set including one or more tuning parameters for tuning the control algorithm that can be accessed through the number of declared variables of the compiled controller code; and
   updating at least one of the one or more tuning parameters of the data set during a tuning process using the development station without altering said compiled controller code in order to tune said control algorithm of the controller without performing a recompilation of the compiled controller code.

14. The method of claim 13 further comprising loading the data set onto the controller such that the compiled controller code has direct accesses to one or more of the tuning parameters through the number of declared variables of the compiled controller code.

15. The method of claim 13, wherein the data set has a predefined data structure.

16. The method of claim 13, wherein the data set has one or more variables that correspond to one or more of the declared variables of the compiled controller code.

17. The method of claim 13, wherein the data set includes one or more variables, wherein the one or more variables of the data set are directly or indirectly accessible via the declared variables of the complied controller code.

18. The method of claim 13, wherein said controller comprises a MPC-based controller.

19. A controller for controlling a dynamic operating process, the controller comprising:
   a memory for storing a compiled controller code, wherein the complied controller code includes one or more references to a pre-allocated memory space that stores a data set that is not compiled, the data set transferred to the pre-allocated memory space from an external source via a communication input of the controller, the data set comprising one or more tuning parameters for tuning the controller;

a processor coupled to the memory for executing the compiled controller code, including referencing the non-compiled data set stored in the pre-allocated memory space of the memory; and the memory repeatedly receiving one or more updates to the data set from the external source during a tuning process of the controller without altering said compiled controller code including performing a recompilation of the compiled controller code, whereupon the compiled controller code references the updated non-compiled data set stored in the pre-allocated memory space of the memory.

20. The controller of claim 19, wherein the controller provides one or more outputs to the dynamic operating process.

\* \* \* \* \*